(12) United States Patent
Dong et al.

(10) Patent No.: US 10,705,828 B2
(45) Date of Patent: Jul. 7, 2020

(54) METHOD AND APPARATUS FOR UPDATING APPLICATION

(71) Applicant: Beijing Xiaomi Mobile Software Co., Ltd., Bejing (CN)

(72) Inventors: Hongguang Dong, Beijing (CN); Shun Chen, Beijing (CN); Wei Tong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/004,202

(22) Filed: Jun. 8, 2018

(65) Prior Publication Data
US 2018/0365003 A1   Dec. 20, 2018

(30) Foreign Application Priority Data
Jun. 14, 2017   (CN) .......................... 2017 1 0448339

(51) Int. Cl.
*G06F 9/445*   (2018.01)
*G06F 9/44*   (2018.01)
(Continued)

(52) U.S. Cl.
CPC ................ *G06F 8/656* (2018.02); *G06F 8/65* (2013.01); *G06F 8/71* (2013.01); *H04L 67/125* (2013.01); *H04L 67/26* (2013.01); *H04L 67/34* (2013.01)

(58) Field of Classification Search
CPC ..... G06F 8/61; G06F 8/60; G06F 8/65; G06F 8/62; G06F 9/445; G06F 9/451;
(Continued)

(56) References Cited

U.S. PATENT DOCUMENTS 6,035,423 A   3/2000   Hodges et al.
6,167,567 A * 12/2000   Chiles ..................... G06F 9/454
717/173
(Continued)

FOREIGN PATENT DOCUMENTS

CN   101283572 A   10/2008
CN   101909084 A   12/2010
(Continued)

OTHER PUBLICATIONS

Stefano Comino et al, To upgrade or not to upgrade? teh release of new versions to survice in the hypercompetitive app market, Nov. 14, 2016, [Retrieved on Oct. 24, 2019]. Retrieved from the internet: <URL: https://dl.acm.org/citation.cfm?id=2993261> 6 Pages (37-42) (Year: 2016).*

(Continued)

*Primary Examiner* — Anibal Rivera
(74) *Attorney, Agent, or Firm* — Arch & Lake LLP

(57) ABSTRACT

A method and apparatus for updating an application are disclosed. According to the method, an update tag corresponding to a target application is pushed to a terminal when determining that the target application is required to be updated, the target application being an application downloaded and installed in the background of the terminal. An acquisition request sent by the terminal based on the update tag is received, the acquisition request being used for requesting to acquire target update content corresponding to the target application. The target update content is pushed to the terminal based on the update tag, such that the terminal opens the target application of a latest version by loading the target update content.

14 Claims, 23 Drawing Sheets

Acquire current version information of the target application stored on the terminal — 101-1

Compare the current version information with latest version information of the target application stored on the server, and determine that the target application is required to be updated when the current version information is inconsistent with the latest version information — 101-2

(51) Int. Cl.
  *G06F 8/656* (2018.01)
  *H04L 29/08* (2006.01)
  *G06F 8/65* (2018.01)
  *G06F 8/71* (2018.01)

(58) Field of Classification Search
  CPC ...... G06F 9/44505; G06F 21/57; G06F 8/656; G06F 8/71; H04L 67/34; H04L 67/1095; H04L 67/26; H04L 67/125
  See application file for complete search history.

(56) References Cited

U.S. PATENT DOCUMENTS

| | | | | |
|---|---|---|---|---|
| 8,918,775 | B1* | 12/2014 | Carpenter | G06F 9/44505 709/203 |
| 9,280,338 | B1* | 3/2016 | Stickle | G06F 9/44536 |
| 2003/0182414 | A1* | 9/2003 | O'Neill | G06F 8/654 709/223 |
| 2004/0215755 | A1* | 10/2004 | O'Neill | G06F 8/654 709/223 |
| 2008/0003991 | A1* | 1/2008 | Sievers | G06F 8/65 455/418 |
| 2008/0040681 | A1* | 2/2008 | Synstelien | G06F 9/451 715/765 |
| 2008/0046371 | A1* | 2/2008 | He | G06F 8/65 705/51 |
| 2008/0112416 | A1 | 5/2008 | Hsieh et al. | |
| 2009/0271779 | A1* | 10/2009 | Clark | G06F 8/71 717/171 |
| 2010/0088696 | A1* | 4/2010 | Stoev | H04L 67/34 717/178 |
| 2012/0110563 | A1* | 5/2012 | Ran | H04M 1/72525 717/170 |
| 2012/0110564 | A1* | 5/2012 | Ran | G06F 8/65 717/173 |
| 2012/0324053 | A1* | 12/2012 | Tian | H04W 4/00 709/217 |
| 2013/0047149 | A1* | 2/2013 | Xu | G06F 8/61 717/175 |
| 2013/0332917 | A1* | 12/2013 | Gaither | G06F 8/656 717/170 |
| 2013/0346872 | A1* | 12/2013 | Scott | G06F 16/9537 715/738 |
| 2014/0012949 | A1* | 1/2014 | Meyers | H04L 67/1095 709/217 |
| 2014/0115572 | A1* | 4/2014 | Michishita | G06F 8/65 717/168 |
| 2014/0280704 | A1* | 9/2014 | Ongg | H04L 67/10 709/217 |
| 2014/0282476 | A1* | 9/2014 | Ciudad | G06F 8/65 717/171 |
| 2014/0282480 | A1* | 9/2014 | Matthew | G06F 8/60 717/172 |
| 2014/0351807 | A1* | 11/2014 | Wen | G06F 8/656 717/173 |
| 2015/0020058 | A1* | 1/2015 | Cao | G06F 8/65 717/170 |
| 2015/0355893 | A1* | 12/2015 | Luk | G06F 8/62 717/178 |
| 2015/0378714 | A1* | 12/2015 | Katariya | G06F 8/65 717/170 |
| 2016/0124741 | A1* | 5/2016 | Hu | G06F 8/65 717/171 |
| 2016/0126775 | A1* | 5/2016 | Park | H02J 50/10 320/108 |
| 2016/0227343 | A1* | 8/2016 | Shen | G06F 8/61 |
| 2016/0253170 | A1* | 9/2016 | Fardig | G06F 8/658 717/170 |
| 2016/0306619 | A1* | 10/2016 | Yan | G06F 8/65 |
| 2016/0335074 | A1* | 11/2016 | Olivier | H04L 67/1095 |
| 2016/0335079 | A1* | 11/2016 | Tammam | G06F 8/656 |
| 2017/0052773 | A1* | 2/2017 | Deselaers | H04L 67/34 |
| 2017/0123781 | A1* | 5/2017 | Chen | G06F 8/61 |
| 2017/0149795 | A1* | 5/2017 | Day, II | H04W 12/08 |
| 2017/0192764 | A1* | 7/2017 | Cayre | H04L 67/125 |
| 2017/0300314 | A1* | 10/2017 | Lopyrev | H04L 67/1097 |
| 2017/0351507 | A1* | 12/2017 | Shantharam | G06F 8/65 |
| 2018/0041623 | A1* | 2/2018 | Song | G06F 3/04817 |
| 2018/0234237 | A1* | 8/2018 | Ye | H04L 9/0891 |
| 2018/0267794 | A1* | 9/2018 | Atchison | F24F 11/32 |
| 2018/0293059 | A1* | 10/2018 | Armand | H04W 8/245 |
| 2019/0108345 | A1* | 4/2019 | Shiomi | G06F 21/57 |

FOREIGN PATENT DOCUMENTS

| | | |
|---|---|---|
| CN | 102110000 A | 6/2011 |
| CN | 104077162 A | 10/2014 |
| CN | 104267987 A | 1/2015 |
| CN | 104375856 A | 2/2015 |
| CN | 104423987 A | 3/2015 |
| CN | 105607935 A | 5/2016 |
| CN | 106033364 A | 10/2016 |
| CN | 106155727 A | 11/2016 |
| CN | 106648787 A | 5/2017 |
| EP | 2806357 A1 | 11/2014 |

OTHER PUBLICATIONS

Elina Vartiainen et al., Auto-update: a concept for automatic downloading of web content to a mobile device, Sep. 10-12, 2007, [Retrieved on Oct. 24, 2019]. Retrieved from the internet: <URL: https://dl.acm.org/citation.cfm?id=1378179> 7 Pages (683-689) (Year: 2007).*

Pinku Hazarika et al., Mobile Cloud Integration for Industrial data Interchange, IEEE 2015, [Retrieved on May 12, 2020]. Retrieved from the internet: <URL: https://ieeexplore.ieee.org/stamp/stamp.jsp?tp=&arnumber=7275760> 5 Pages (1118-1122) (Year: 2015).*

Extended European Search Report issued in Application No. 18177853.1, dated Jan. 9, 2019, Germany, 9 pages.

Office Action and Search Report issued to Chinese Application No. 201710448339,1, dated Jan. 19, 2020 with machine translation, (27p).

* cited by examiner

METHOD AND APPARATUS FOR UPDATING APPLICATION

CROSS REFERENCE TO RELATED APPLICATIONS

This application claims priority to Chinese Patent Application No. 201710448339.1, filed on Jun. 14, 2017, the entire content of which is incorporated herein by reference.

TECHNICAL FIELD

The present disclosure relates to the field of information interaction, and more particularly, to a method and apparatus for updating an application.

BACKGROUND

During downloading and installation of an application, a user needs to manually trigger an installation key, such that a terminal may download and install the application. An updating process of the application may be more complicated. An update prompt box may be popped up when the terminal detects that the application has a new version. Only after the user manually determines to update the application may the terminal download the update content from a server so as to update the application.

SUMMARY

Examples of the present disclosure provide a method and apparatus for updating an application.

According to a first aspect of the present disclosure, there is provided a method of updating an application used in a server. The method may include: pushing, by the server, an update tag corresponding to a target application to a terminal when determining that the target application is required to be updated; receiving, by the server, an acquisition request sent by the terminal based on the update tag, the acquisition request being used for requesting to acquire a target update content corresponding to the target application; and pushing, by the server, the target update content to the terminal based on the acquisition request, such that the terminal opens the target application of the latest version by loading the target update content.

According to a second aspect of the present disclosure, there is provided a method of updating an application, including: sending, by a terminal, an acquisition request to a server based on an update tag corresponding to a target application, the acquisition request being used for requesting to acquire target update content corresponding to the target application; receiving, by the terminal, the target update content pushed by the server based on the acquisition request; and opening, by the terminal, the target application of the latest version by loading the target update content.

According to a third aspect of the present disclosure, there is provided an apparatus for updating an application used in a server. The apparatus may include: a first pushing module, a first receiving module, and a second pushing module. The first pushing module is configured to push an update tag corresponding to a target application to a terminal when determining that the target application is required to be updated. The first receiving module is configured to receive an acquisition request sent by the terminal based on the update tag, the acquisition request being used for requesting to acquire target update content corresponding to the target application. The second pushing module is configured to push the target update content to the terminal based on the acquisition request, such that the terminal opens the target application of the latest version by loading the target update content.

According to a fourth aspect of the present disclosure, there is provided an apparatus for updating an application, which is used in a terminal. The apparatus includes: a sending module, a second receiving module, and a first executing module. The sending module is configured to send an acquisition request to a server based on an update tag corresponding to a target application, the acquisition request being used for requesting to acquire target update content corresponding to the target application. The second receiving module, configured to receive the target update content pushed by the server based on the acquisition request. The first executing module, configured to open the target application of the latest version by loading the target update content.

According to a fifth aspect of the present disclosure, there is provided a machine-readable storage medium, storing machine-executable instructions. The machine-executable instructions are used for executing the method of updating an application according to the first aspect.

According to a sixth aspect of the present disclosure, there is provided a machine-readable storage medium, storing machine-executable instructions. The machine-executable instructions are used for executing the method of updating an application according to the second aspect.

According to a seventh aspect of the present disclosure, there is provided an apparatus for updating an application used in a server, which includes: a processor, and a machine-readable storage medium, configured to store machine-executable instructions executable by the processor. By executing the machine-executable instructions, the processor is caused to: push an update tag corresponding to a target application to a terminal when determining that the target application is required to be updated; receive an acquisition request sent by the terminal based on the update tag, the acquisition request being used for requesting to acquire a target update content corresponding to the target application; and push the target update content to the terminal based on the acquisition request, such that the terminal opens the target application of the latest version by loading the target update content.

According to an eighth aspect of the present disclosure, there is provided an apparatus for updating an application used in a terminal, including: a processor, and a machine-readable storage medium, configured to store machine-executable instructions executable by the processor. By executing the machine-executable instructions, the processor is caused to: send an acquisition request to a server based on an update tag corresponding to a target application, the acquisition request being used for requesting to acquire a target update content corresponding to the target application; receive the target update content pushed by the server based on the acquisition request; and open the target application of the latest version by loading the target update content.

It should be understood that the above general description and the detailed description below are merely exemplary and explanatory, and do not limit the present disclosure.

BRIEF DESCRIPTION OF DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Figure 1:
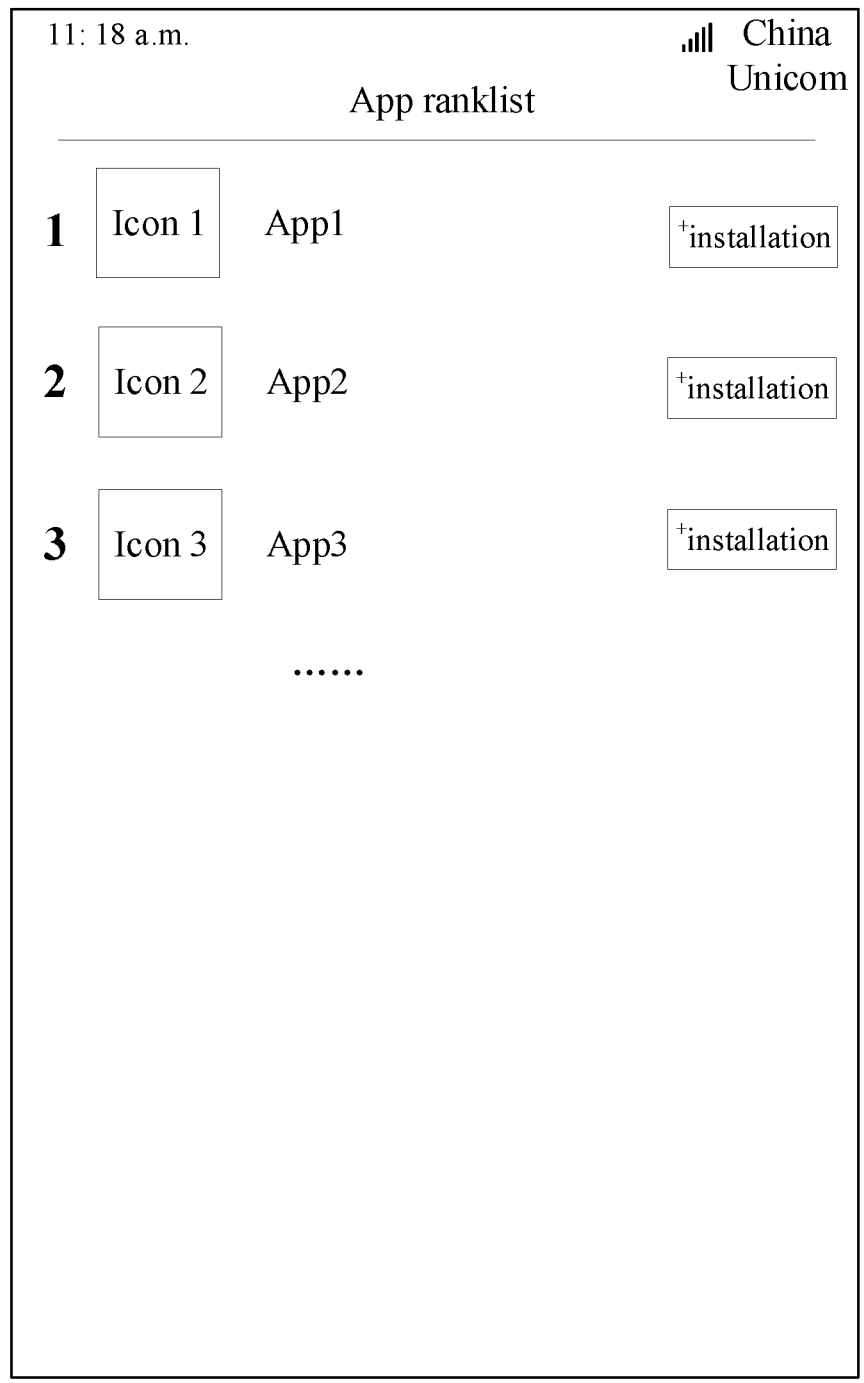
FIG. 1 is a schematic diagram of an application update scene illustrated according to an example.

Reference will now be made in detail to examples, which are illustrated in the accompanying drawings. When accompanying figures are mentioned in the following descriptions, the same numbers in different drawings represent the same or similar elements, unless otherwise represented. The implementations set forth in the following examples do not represent all implementations consistent with the present disclosure. Instead, they are merely examples of apparatuses and methods consistent with aspects related to the present disclosure as recited in the appended claims.

Terms used in the present disclosure are only for the purpose of description of specific examples, and are not intended to limit the present disclosure. As used in the present disclosure and appended claims, the singular forms "a/an", "said" and "the" intend to also include the plural form, unless the content clearly dictates otherwise. It should also be understood that the term "and/or" used herein means to include arbitrary and all possible combinations of one or more items listed in association.

It should be understood that terms such as "first", "second", "third" and the like may be used herein for description of information. However, the information shall not be restricted to these terms. These terms are only intended to distinguish among information of the same type. For example, under the circumstance of not departing from the scope of the present disclosure, first information can also be referred to as a second information, similarly, second information can also be referred to as first information. Depending on the context, term "if" used herein can be interpreted as "when", "while" or "in response to determining".

In the present disclosure, the server may push an update tag corresponding to a target application to a terminal when determining that the target application is required to be updated. The terminal may send the acquisition request to the server based on the update tag. The server further pushes the target update content corresponding to the target application to the terminal based on the acquisition request, such that the terminal may open the target application of the latest version by loading the target update content. The target application is an application running in background of the terminal during downloading and installation. Through the above procedures, the target update content can be timely pushed to the target application, thereby ensuring that a target application opened by the terminal every time is the target application of the latest version. In other words, by using the disclosed method, the terminal will always have the latest version of the target application.

In an example of the present disclosure, the server may compare the current version information of the target application stored on the terminal with latest version information of the target application stored on the server. It may be determined that the target application is not required to be updated when the current version information is consistent with the latest version information. Otherwise, it may be determined that the target application is required to be updated. Therefore, the implementation is simple and the availability is high.

In an example of the present disclosure, alternatively, the server may carry out a detection when determining that the preset update detection condition is satisfied currently. In this way, the update tag may be pushed to the terminal when determining that the target application is required to be updated. Through the above procedures, the server may timely determine whether the target application needs to be updated, and may subsequently ensure that a target application opened by the terminal every time is the target application of the latest version.

In an example of the present disclosure, the terminal may send the acquisition request to the server based on the update tag corresponding to the target application. Further, after receiving the target update content pushed by the server based on the acquisition request, the terminal may directly open the target application of the latest version by loading the target update content. The target application is an application running in background of the terminal during downloading and installation. Through the above procedures, it may be ensured that the target application opened every time at the terminal is the target application of the latest version, and thus the user experience may be improved.

In an example of the present disclosure, alternatively, the terminal may send the acquisition request to the server based on the update tag when determining that the target application is required to be opened. The terminal may determine that the target application is required to be opened based on an operation of a user in an application store, a browser or an application platform configured to open the target application. Further, it may be determined that the target application is required to be opened currently when contact information is detected on a preset key used for opening the target application, or a trigger action for a preset icon corresponding to the target application is detected, or a trigger action for a preset display element used for opening the target application is detected. Through the above procedures, the target application of the latest version may be more quickly opened.

In an example of the present disclosure, alternatively, the terminal may first detect whether the update tag corresponding to the target application is stored. When the update tag is stored, it is requested to acquire the target update content based on the update tag. When the update tag is not stored, this indicates that the target application stored on the terminal is the target application of the latest version. Then, the terminal may load the target loading content stored on the terminal and required for opening the target application, such that the target application of the latest version can be opened.

In an example of the present disclosure, after acquiring the target update content pushed by the server, the terminal may store the target update content, and further erase the update tag. Through the above procedures, when the server determines again that the target application needs to be updated, the update tag may be pushed to the terminal, thereby ensuring the accuracy of the update tag stored on the terminal.

When a user opens, in an application store via a terminal, a certain application (App) not installed on the terminal, the user may click an installation key corresponding to the App, as shown in FIG. 1. Then, the terminal may automatically acquire an installation package corresponding to the App from the server, and may start the installation after the installation package is registered. Upon completion of the installation, the user may open the App by triggering a hardkey or softkey used for opening the App or an icon corresponding to the App. An update prompt box may be popped up when the terminal detects that the App has a new version. Only after the user manually determines to update the App, the terminal may start downloading the update content from the server so as to update the App. Upon completion of the update, the App may be opened by restarting the App.

In an example of the present disclosure, a method of updating an application is provided. According to the method, a target application may be downloaded and installed in background of the terminal without needing confirmation of the user, which thus may not involve with a registration process of the server. The terminal may acquire the installation package of the target application from the server, and may open the target application of the latest version after loading the target application. If the acquired installation package of the target application is a compressed packet, the terminal may un-compress the installation package before loading the target application. Downloading and installation of the target application may be performed in background. That is, the installation process can be invisible to the user.

Figure 2A:
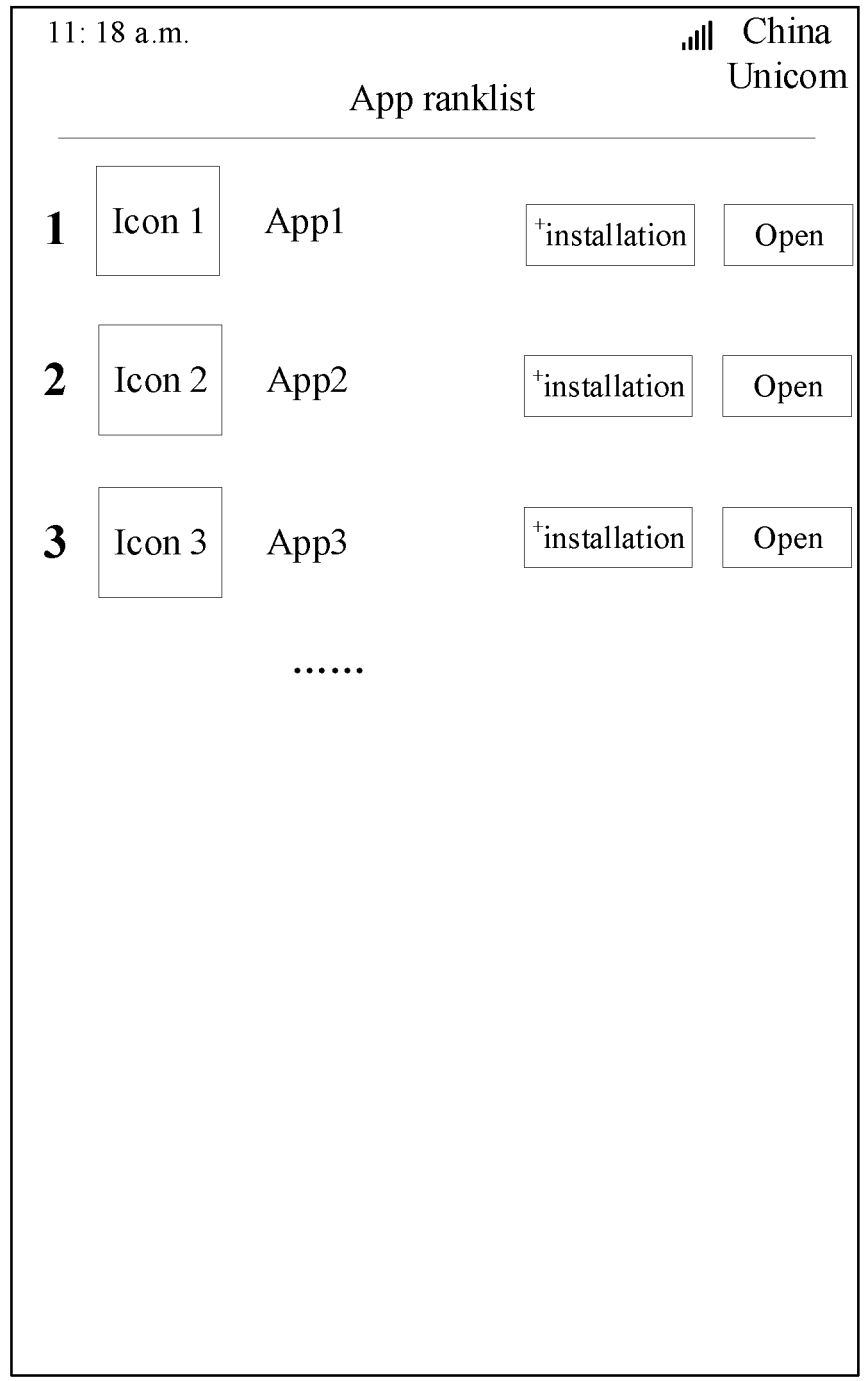
FIG. 2A is a schematic diagram of application update scenes illustrated according to some examples.
Figure 2B:
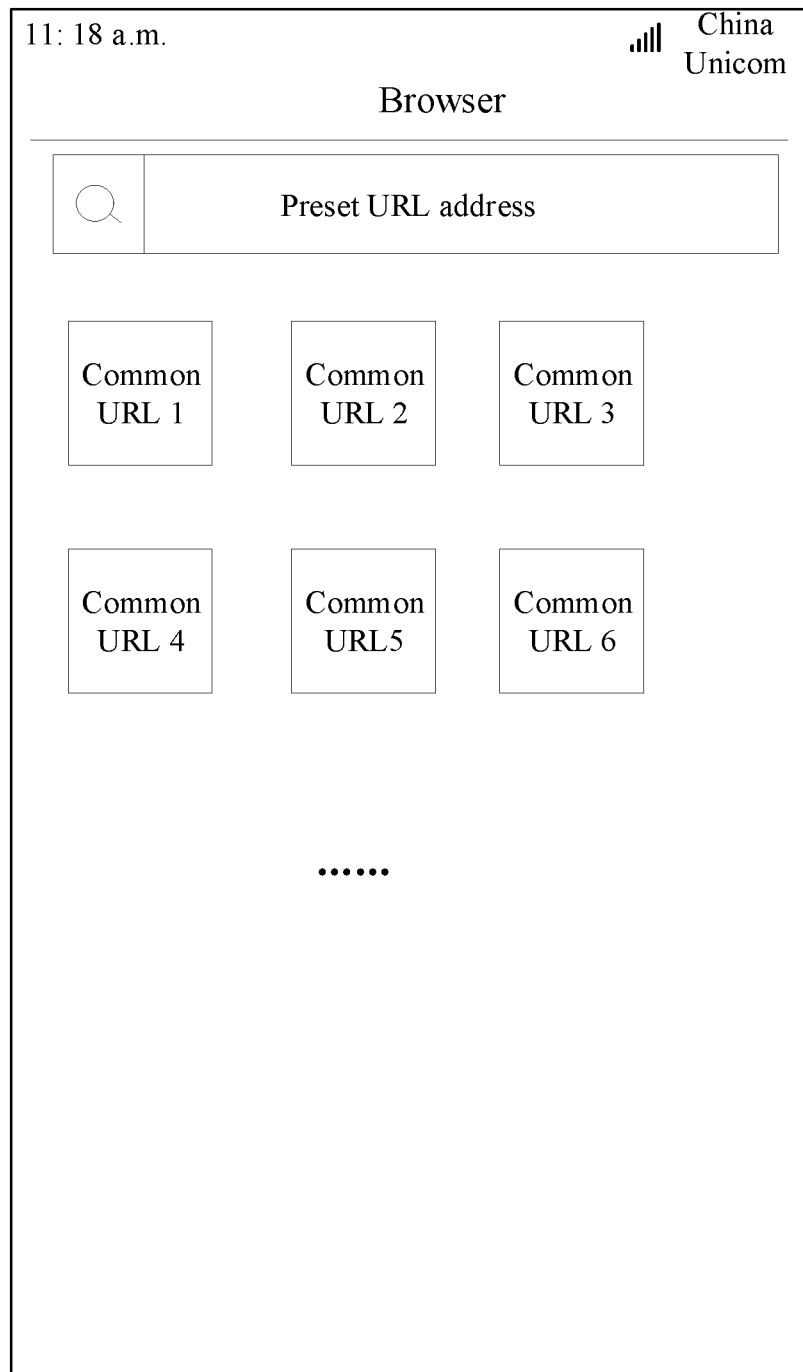
FIG. 2B is a schematic diagram of application update scenes illustrated according to some examples.
Figure 2C:
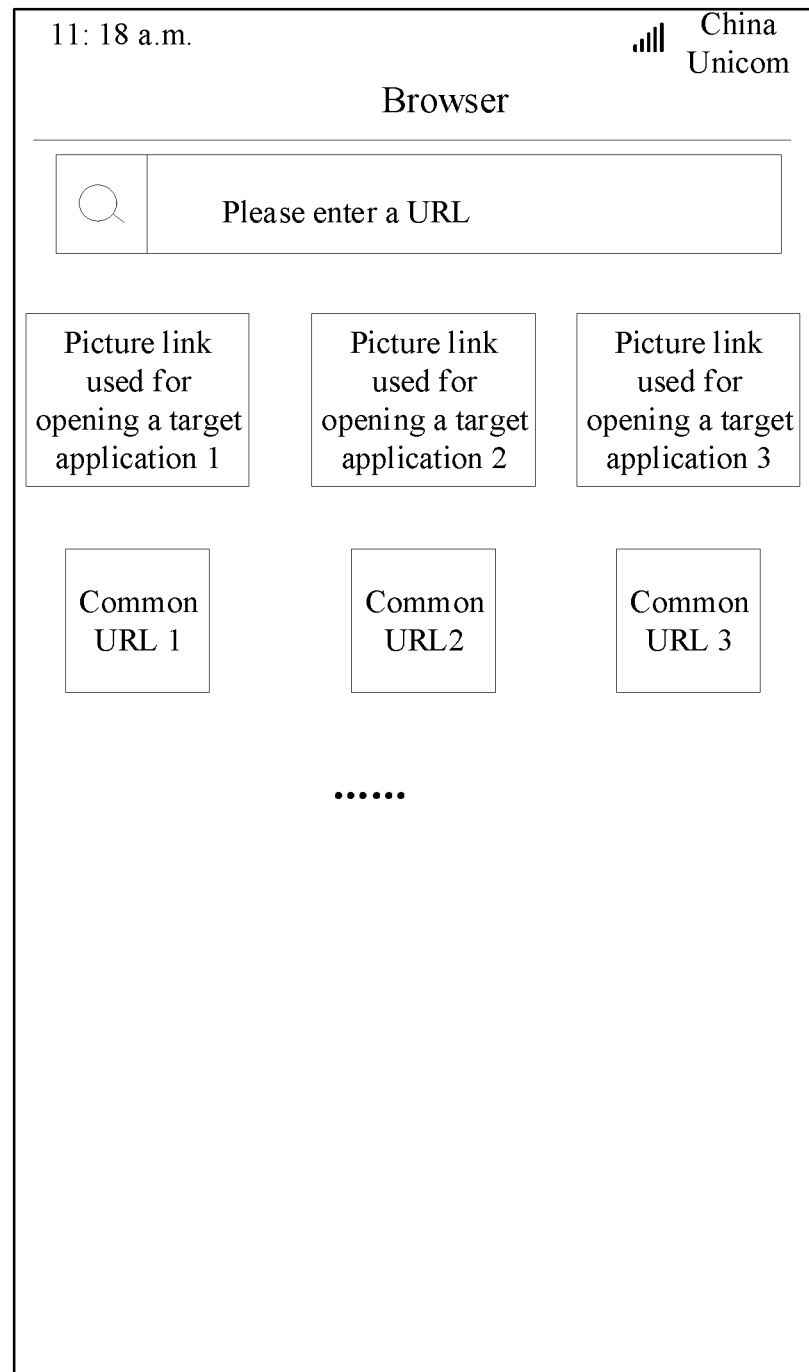
FIG. 2C is a schematic diagram of application update scenes illustrated according to some examples.

From the user's perspective, the user may directly open the target application by triggering a key used for opening the App, as shown in FIG. 2A, or by triggering a preset display element used for displaying the target application. The preset display element may be a preset uniform resource locator (URL) address, for example, as shown in FIG. 2B. Alternatively, the preset display element may also be a preset picture link to the target application, for example, as shown in FIG. 2C.

Of course, upon completion of first installation of the target application, the target application may output prompt information to allow the user to select whether to install an icon corresponding to the target application, such that the user may open the target application by directly clicking the icon when it is required to open the target application the next time.

According to the method of updating an application provided by the examples of the present disclosure, the update of the target application may be completed before the user opens the target application. Thus, it is unnecessary to restart the target application, and it can be ensured that the target application opened by the terminal every time has a latest version. The application updating procedures of the target application provided by the examples of the present disclosure may be introduced in the following.

Figure 3:
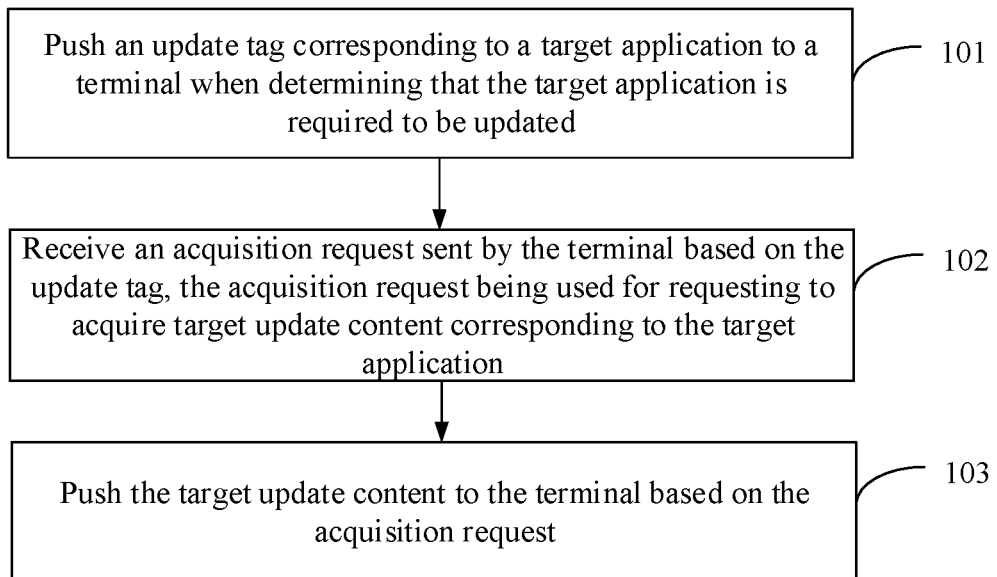
FIG. 3 is a flowchart of a method of updating an application illustrated according to an example.

An example of the present disclosure provides a method of updating the above target application, which may be used in a server. FIG. 3 is a flowchart of a method of updating an application illustrated according to an example. The method of updating an application may include following blocks.

At block 101, an update tag corresponding to a target application may be pushed to a terminal when determining that the target application is required to be updated.

At block 102, an acquisition request sent by the terminal based on the update tag may be received. The acquisition request is used for requesting to acquire target update content corresponding to the target application. For example, acquisition request may request the server to push target update content corresponding to the target application.

At block 103, the target update content may be pushed to the terminal based on the acquisition request, such that the terminal may open the target application of the latest version by loading the target update content.

Herein, the target application may be an application downloaded and installed in background of the terminal.

In the above example, the server may push an update tag corresponding to a target application to a terminal when determining that the target application is required to be updated. The terminal may send the acquisition request to the server based on the update tag. The server may further push the target update content corresponding to the target application to the terminal based on the acquisition request, such that the terminal may open the target application of the latest version by loading the target update content. Downloading and installation of the target application may be performed in background of the terminal. Through the above procedures, the target update content may be timely pushed to the target application without additional user operation, thereby ensuring that the target application opened by the terminal every time has a latest version.

Figure 4:
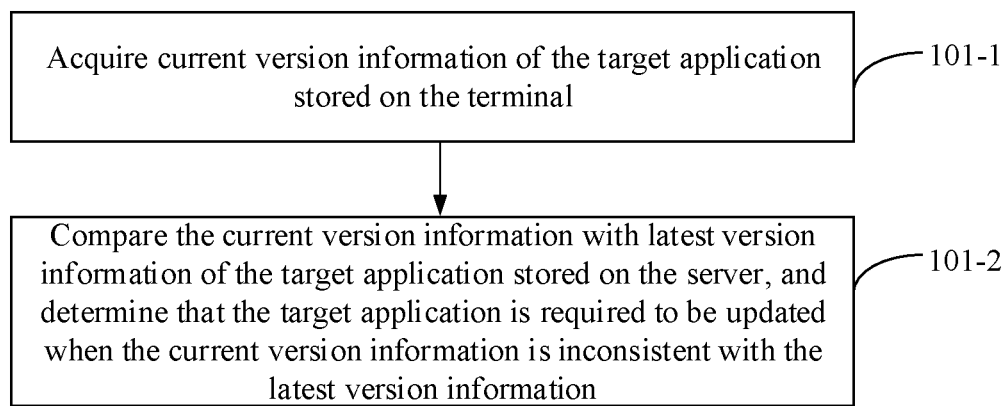
FIG. 4 is a flowchart of another method of updating an application illustrated according to an example.

Alternatively, reference may be made to FIG. 4 for the block 101, FIG. 4 is a flowchart of another method of updating an application illustrated according to the example as shown in FIG. 3. The method of updating an application may include following blocks.

At block 101-1, current version information of the target application stored on the terminal may be acquired.

At this block, the server may receive the current version information of the target application reported by the terminal.

At block 101-2, the current version information may be compared with latest version information of the target application stored on the server, and it may be determined that the target application is required to be updated when the current version information is inconsistent with the latest version information.

At this block, the server may compare the current version information reported by the terminal with the latest version information of the target application stored on the server. It may be determined that the target application of the latest version is stored on the terminal and thus it is unnecessary to update the target application when the current version information is consistent with the latest version information. It may be determined that the target application stored on the terminal is not the target application of the latest version and thus it is necessary to update the target application when the current version information is inconsistent with the latest version information.

Alternatively, in the foregoing example, to facilitate the subsequently-pushed target update content to fit with the terminal, the server may still acquire model information of the terminal in addition to the current version information reported by the terminal. Further, the server may determine the latest version information of the target application stored thereon, which is matched with the model information. The current version information reported by the terminal may be compared with the latest version information, and it is determined that the target application needs to be updated when the current version information is inconsistent with the latest version information. After it is determined that the target application needs to be updated, the server may push an update tag corresponding to the target application to the terminal. The terminal may send an acquisition request to the server based on the update tag. The acquisition request is used for requesting to acquire target update content corresponding to the target application.

For the block 102, the server may receive the acquisition request sent by the terminal based on the update tag.

For the block 103, the server may push the target update content to the terminal based on the acquisition request. The target update content is data content required for upgrading the target application on the terminal into the latest version. The target update content may be sent in a compressed package. Correspondingly, after receiving the compressed package, the terminal may un-compress the compressed package, then may load the target update content therein, and then may open the target application of the latest version.

Here, the server may send the latest version information of the target application stored therein to the terminal, and the terminal may compare the stored current version information of the target application with the latest version information. An update tag corresponding to the target application may be automatically generated when the current version information is inconsistent with the latest version information. Further, the terminal may send an acquisition request to the server based on the update tag to acquire target loading content. Alternatively, the terminal may send the acquisition request based on the update tag when determining that it is required to open the target application. In an example, the update tag pushed by the server to the terminal or the update tag automatically generated by the terminal may be stored in a memory space in the terminal corresponding to the target application. Of course, this is not restrictive, and the update tag may also be stored in other memory spaces according to the actual situation.

In the above procedures, the size of the data packet carrying the target update content is smaller, and thus the server may quickly send the target update content to the terminal, thereby ensuring that the terminal may quickly open the target application.

Figure 5:
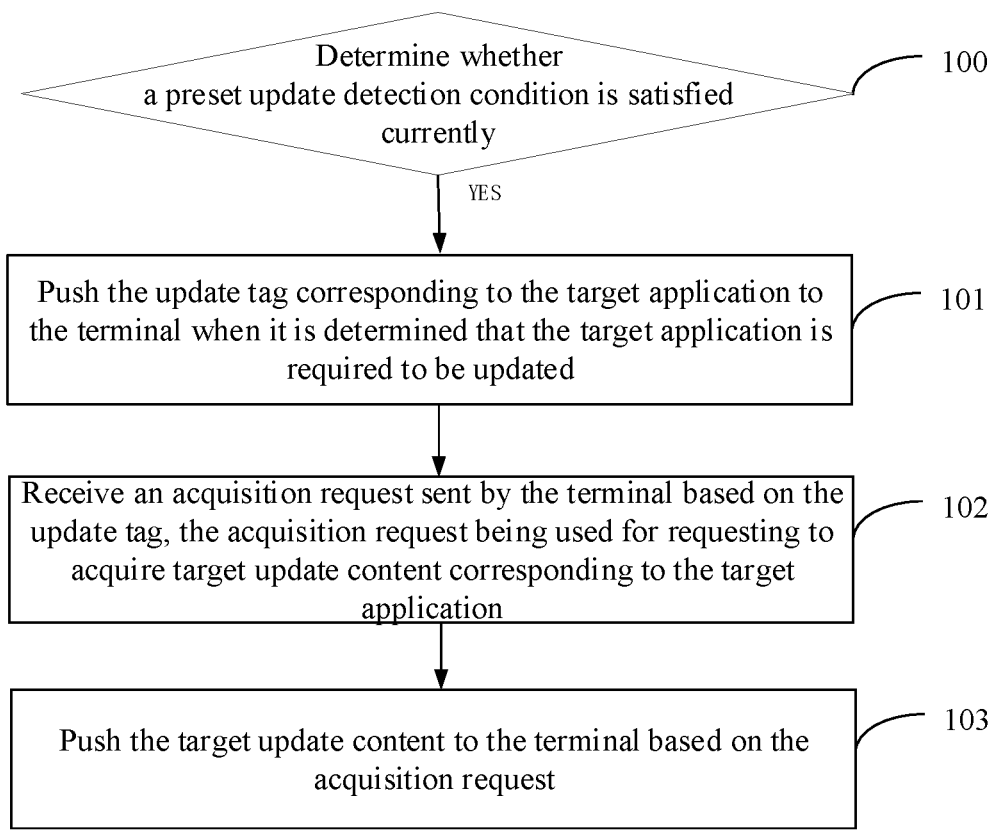
FIG. 5 is a flowchart of still another method of updating an application illustrated according to an example.

In an example, alternatively, reference may be made to FIG. 5 for the method of updating an application. FIG. 5 is a flowchart of another method of updating an application illustrated according to the example as shown in FIG. 3. This method of updating an application may further include following blocks.

At block 100, it is determined whether a preset update detection condition is satisfied currently.

In the example of the present disclosure, alternatively, the preset update detection condition may include any one of followings:

reaching a preset time point for an update detection;

receiving an opening request sent by the terminal to request to open the target application;

receiving a notification message sent by the terminal, the notification message being used for notifying an application platform configured to open the target application completes a start-up operation; and detecting that the latest version information of the target application is changed.

At this block, the server may determine that the preset update detection condition is satisfied when:

the preset period for an update detection reaches a preset time point for an update detection; or an opening request sent by the terminal to request to open the target application is received; or a notification message sent by the terminal is received, the notification message being used for notifying an application platform configured to open the target application completes a start-up operation; and it is detected that the latest version information of the target application is changed.

The application platform may be a platform configured to open the target application. The application platform includes but is not limited to the following platforms.

Figure 6:
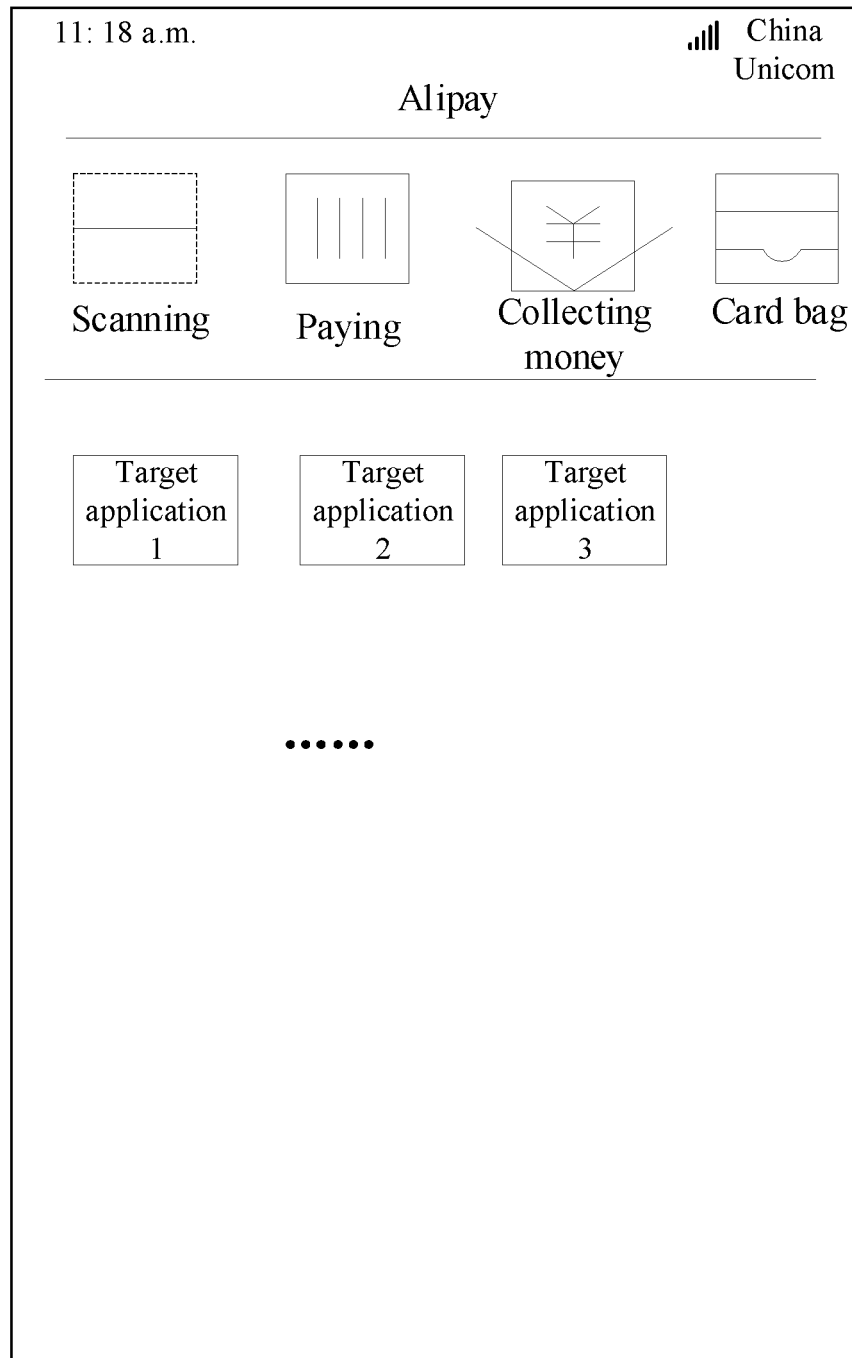
FIG. 6 is a schematic diagram of another application update scene illustrated according to an example.

For example, the application platform may be a platform directly installed in an operating system such as Android or IOS; or the application platform may be some platform apps such as WeChat®, Alipay®, QQ®, and so on. For example, as shown in FIG. 6, a user may open the target application through the application platform. Alternatively, the application platform may also be a browser. In an example of the present disclosure, the terminal may detect whether the application platform completes the start-up operation. The terminal may send the notification message to the server after it is determined that the application platform has completed the start-up operation. After receiving the notification message, the server may determine that the application platform has completed the start-up operation.

Then, an update detection may be carried out. It is determined whether the target application is required to be updated through the block 101, and the update tag corresponding to the target application may be pushed to the terminal when it is determined that the target application is required to be updated.

Through the above procedures, the server may timely determine whether the target application needs to be updated, and may subsequently ensure that a target application opened by the terminal every time has a latest version.

Figure 7:
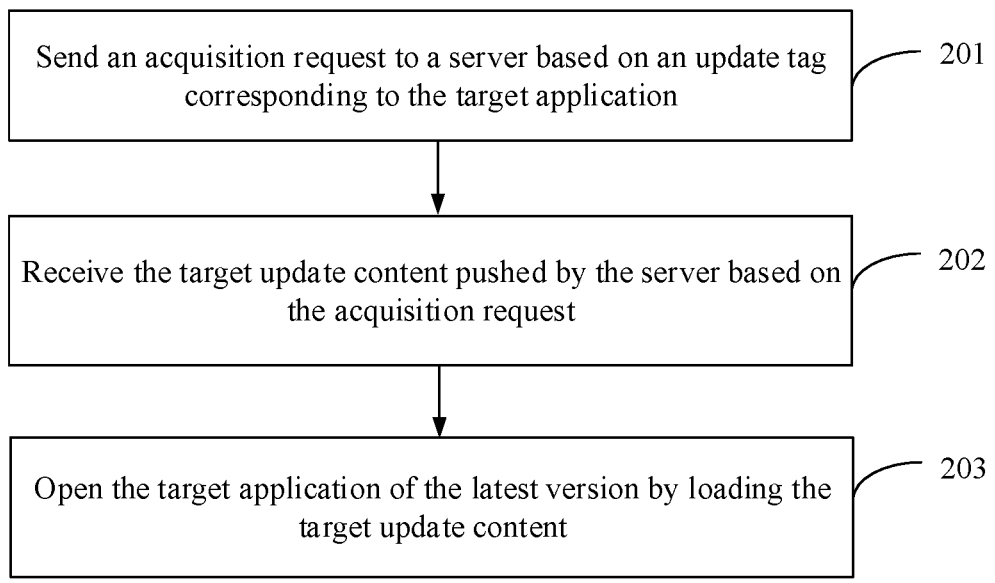
FIG. 7 is a flowchart of still another method of updating an application illustrated according to an example.

The present disclosure further provides another method of updating the above target application, which may be used in a terminal. FIG. 7 is a flowchart of another method of updating an application illustrated according to an example, and the method of updating an application may include following blocks.

At block 201, an acquisition request may be sent to a server based on an update tag corresponding to the target application, the acquisition request being used for requesting to acquire a target update content corresponding to the target application.

At block 202, the target update content pushed by the server based on the acquisition request may be received.

At block 203, the target application of the latest version may be opened by loading the target update content.

Herein, the target application may be an application downloaded and installed in background of the terminal.

In the foregoing example, the terminal may send the acquisition request to the server based on the update tag corresponding to the target application. Further, after receiving the target update content pushed by the server based on the acquisition request, the terminal may load the target update content, such that the terminal opens the target application of the latest version. Downloading and installation of the target application may be performed in background of the terminal. Through the above procedures, it can be ensured that the target application opened by the terminal every time has a latest version, and thus the user experience may be improved.

For the block 201, alternatively, the terminal may send the acquisition request to the server based on the update tag when determining that the target application is required to be opened. The terminal may determine whether it is required to open the target application in an application store, a browser, or an application platform configured to open the target application.

Figure 8A:
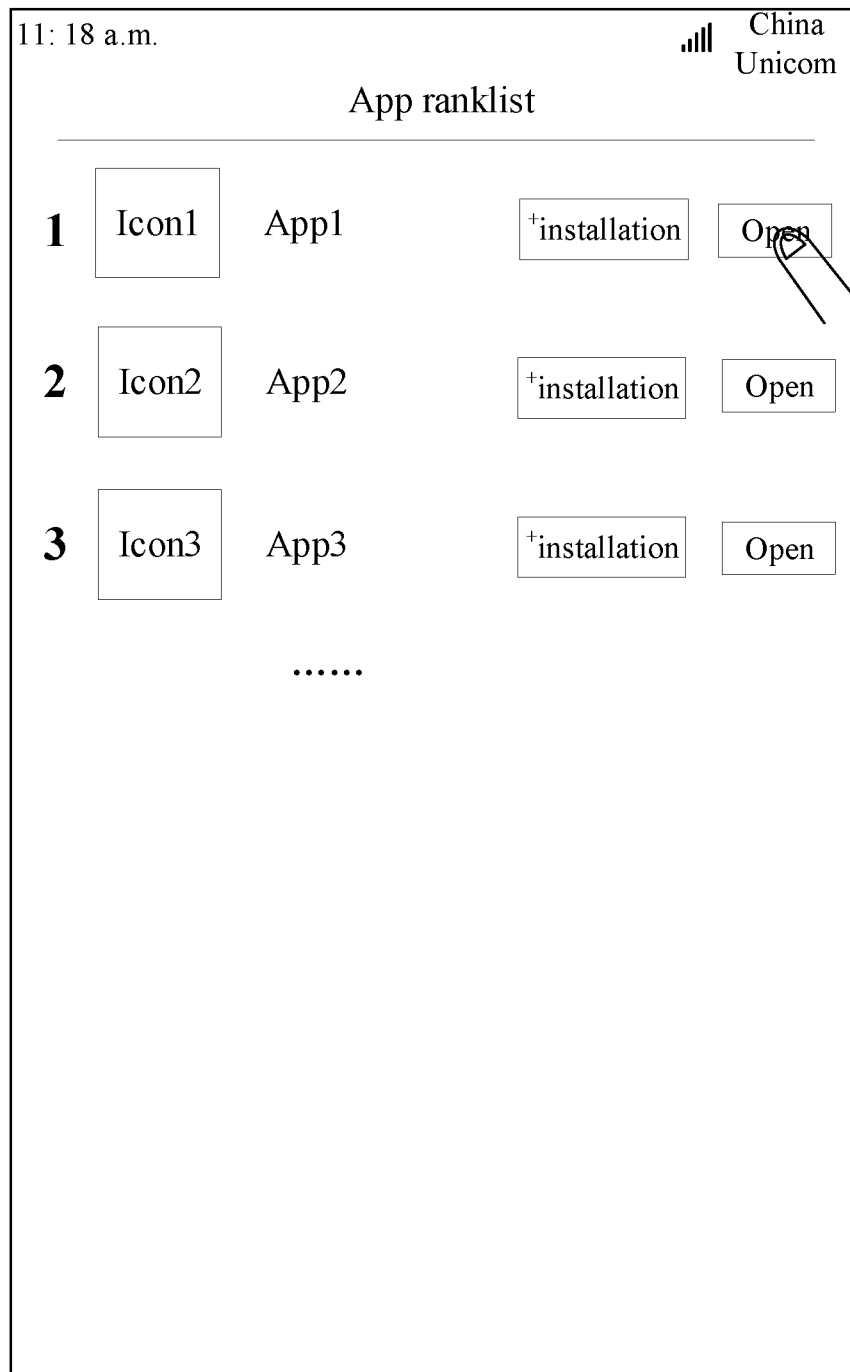
FIG. 8A is a schematic diagram illustrating application update scenes according to an aspect of the disclosure.

Alternatively, when detecting information regarding a contact on a preset key in the application store, the browser or the application platform, for example, as shown in FIG. 8A, the terminal may determine that it is required to open the target application currently. The information regarding a contact may be referred to contact information.

Figure 8B:
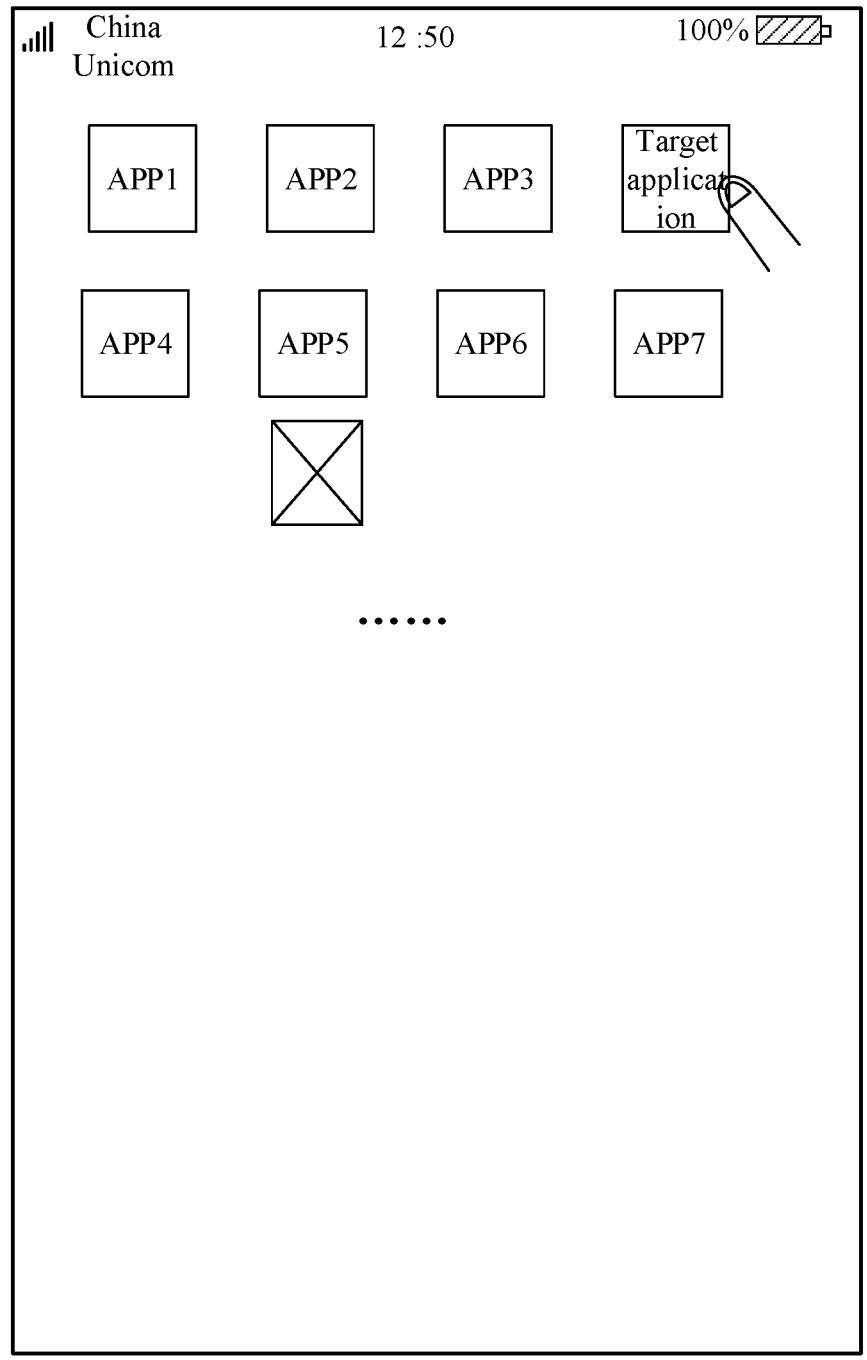
FIG. 8B is a schematic diagram illustrating application update scenes according to an aspect of the disclosure.

Alternatively, when a preset icon corresponding to the target application has been installed on the terminal, the terminal may detect a trigger action for the preset icon, for example, as shown in FIG. 8B, and likewise, the terminal may determine that it is required to open the target application currently.

Figure 8C:
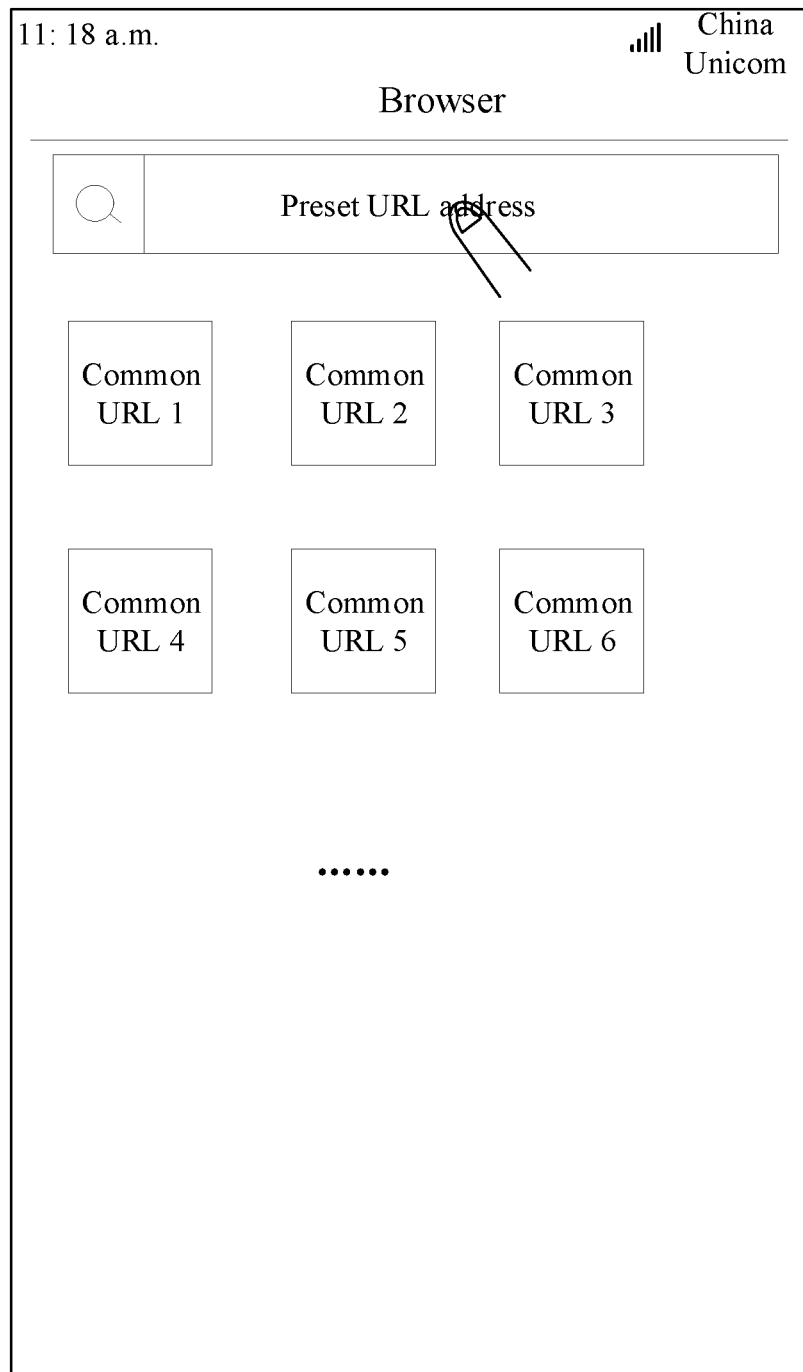
FIG. 8C is a schematic diagram illustrating application update scenes according to an aspect of the disclosure.
Figure 8D:
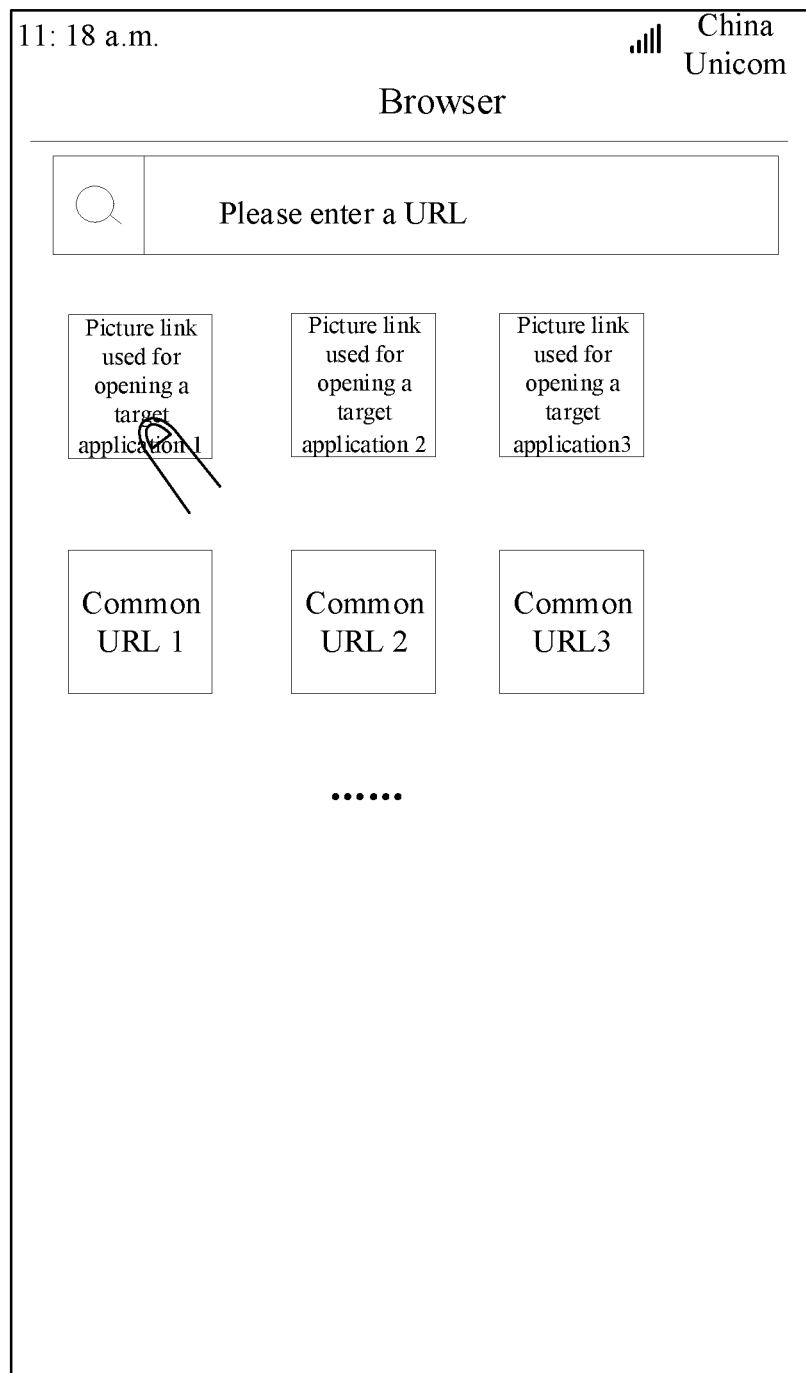
FIG. 8D is a schematic diagram illustrating application update scenes according to an aspect of the disclosure.
Figure 8E:
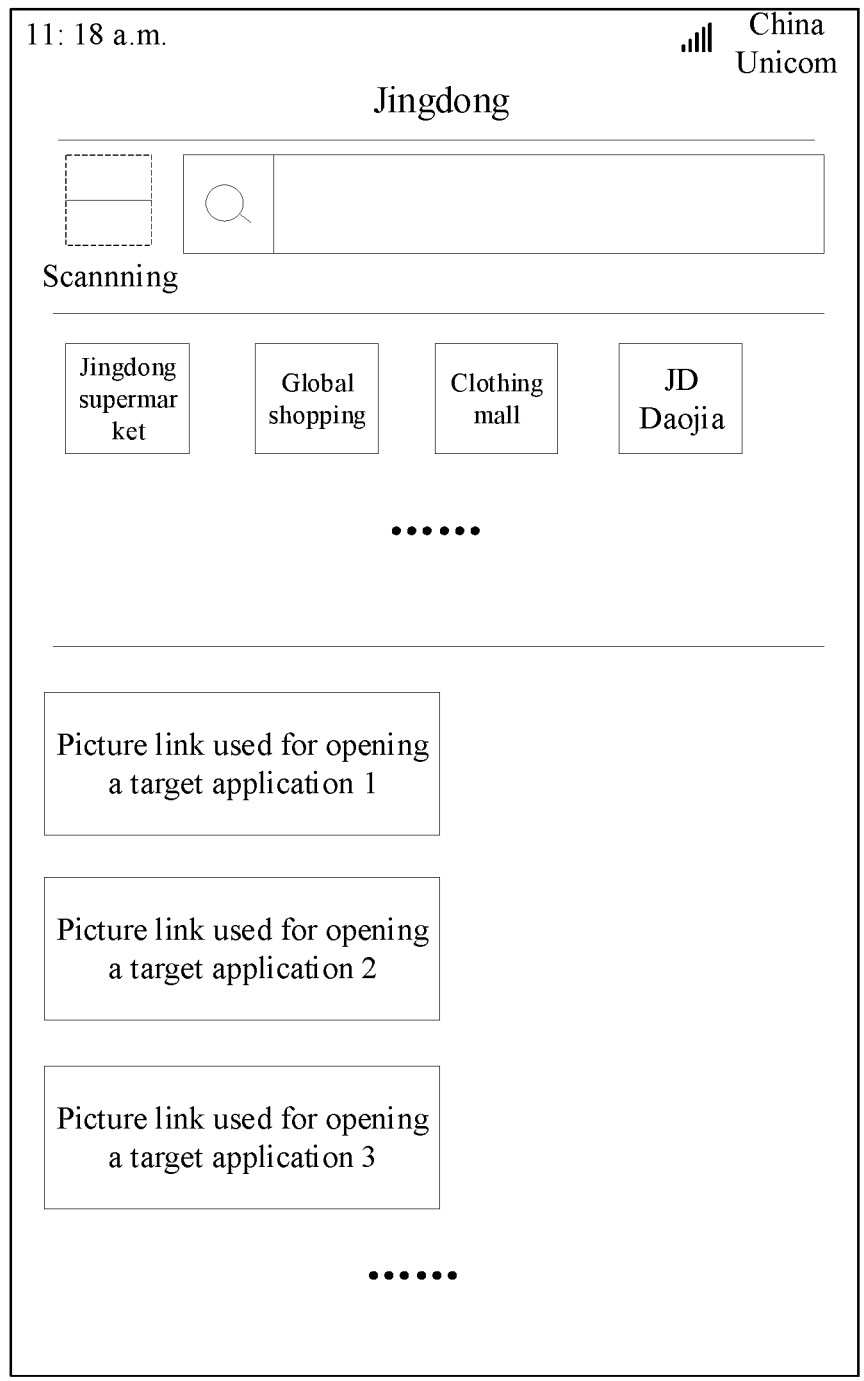
FIG. 8E is a schematic diagram illustrating application update scenes according to an aspect of the disclosure.

Alternatively, the terminal may also determine that it is required to open the target application when a trigger action for a preset display element used for opening the target application is detected in the browser or the application platform. Alternatively, the preset display element may be a URL address, for example, as shown in FIG. 8C. Alternatively, the preset display element may be a picture link. The picture link may be provided by the browser, for example, as shown in FIG. 8D; or the picture link may be provided by a certain application, for example, as shown in FIG. 8E.

In an example of the present disclosure, the terminal may determine whether to perform an update detection on the target application by detecting whether it is required to open the target application. When determining that it is required to open the target application, the terminal may detect whether the update tag exists. When the update tag previously pushed by the server or automatically generated by the terminal exists, the terminal may send the acquisition request to the server so as to request to acquire the target update content corresponding to the target application. Further, the terminal may open the target application after loading the target update content. In this way, the target application of the latest version may be opened without restarting the target application.

In an example of the present disclosure, the terminal may send the acquisition request to the server based on the update tag in case of reaching a preset time point for a periodic update of the target application, or when detecting that the application platform has completed a start-up operation, or when detecting that the latest version information of the target application is changed.

When the terminal detects whether the latest version information of the target application is changed, alternatively, the server may send the currently-stored latest version information of the target application to the terminal, such that the terminal may compare the current version information of the target application stored therein with the latest version information. When the current version information is consistent with the latest version information, this indicates that the latest version information of the target application is not changed. Otherwise, this indicates that the latest version information of the target application is changed.

In an example of the present disclosure, alternatively, the terminal may also send an opening request to the server when determining that it is required to open the target application, the server may determine whether the update detection condition is satisfied based on the opening request, and further the server may detect whether it is required to update the target application. Alternatively, the terminal may send a notification message to the server after determining that the application platform has been started, the server may determine whether the update detection condition is satisfied based on the notification message, and further the server may detect whether it is required to update the target application.

For the above block 202, the server may push the target update content to the terminal based on the acquisition request, such that the terminal may receive the target update content.

For the above block 203, alternatively, the terminal may load the target update content in background so as to open the target application of the latest version. That is, the update process may be invisible to the user. Alternatively, the terminal may also display the process of loading the target update content in foreground such that the user may know about the update progress, and the terminal may open the target application of the latest version upon completion of loading the target update content.

Through the above procedures, the terminal may determine that it is required to open the target application in an application store, a browser, or an application platform configured to open the target application. Further, it may be determined that the target application is required to be opened currently when contact information is detected on a preset key used for opening the target application, or a trigger action for a preset icon corresponding to the target application is detected, or a trigger action for a preset display element used for opening the target application is detected. Thus, the target application of the latest version may be more quickly opened.

Figure 9:
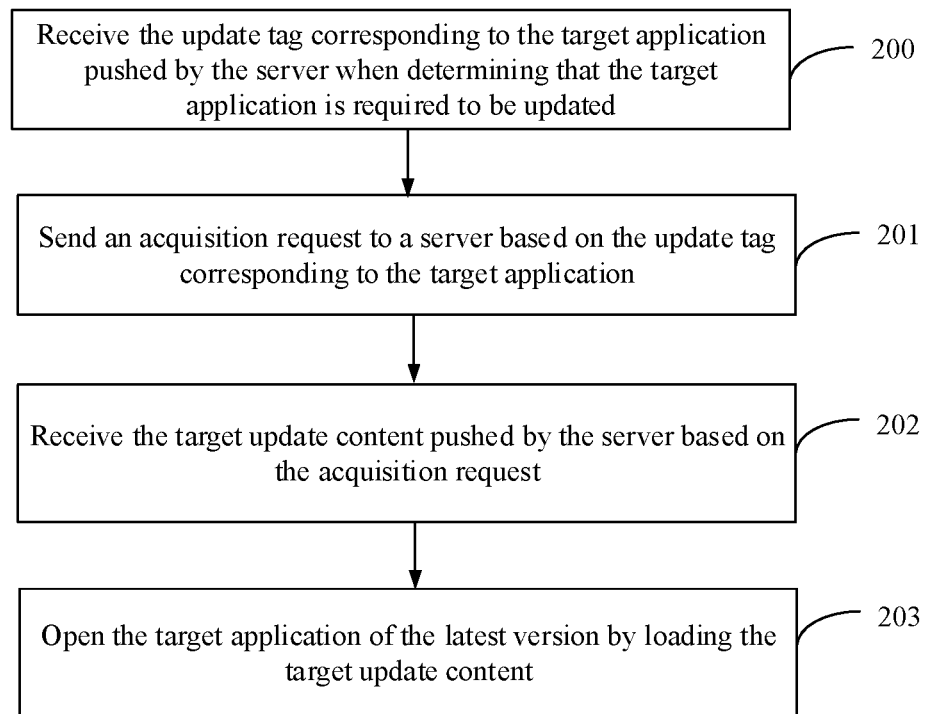
FIG. 9 is a flowchart of still another method of updating an application according to an example.

FIG. 9 is a flowchart illustrating another method of updating an application illustrated according to the example as shown in FIG. 7. Before block 201 is executed, this method of updating an application may further include following blocks.

At block 200, it may be received the update tag corresponding to the target application pushed by the server when determining that the target application is required to be updated.

At this block, the server may determine whether the target application needs to be updated according to the method provided by the above example, and may push the update tag to the terminal when determining that the target application needs to be updated, and the terminal may receive the update tag.

After receiving the update tag, the terminal may store the update tag. Further, block 201 is executed: the acquisition request may be sent to the server based on the update tag corresponding to the target application.

Through the above procedures, after receiving the update tag pushed by the server, the terminal may send the acquisition request to the server, to ensure that the terminal may open the target application of the latest version subsequently.

Figure 10:
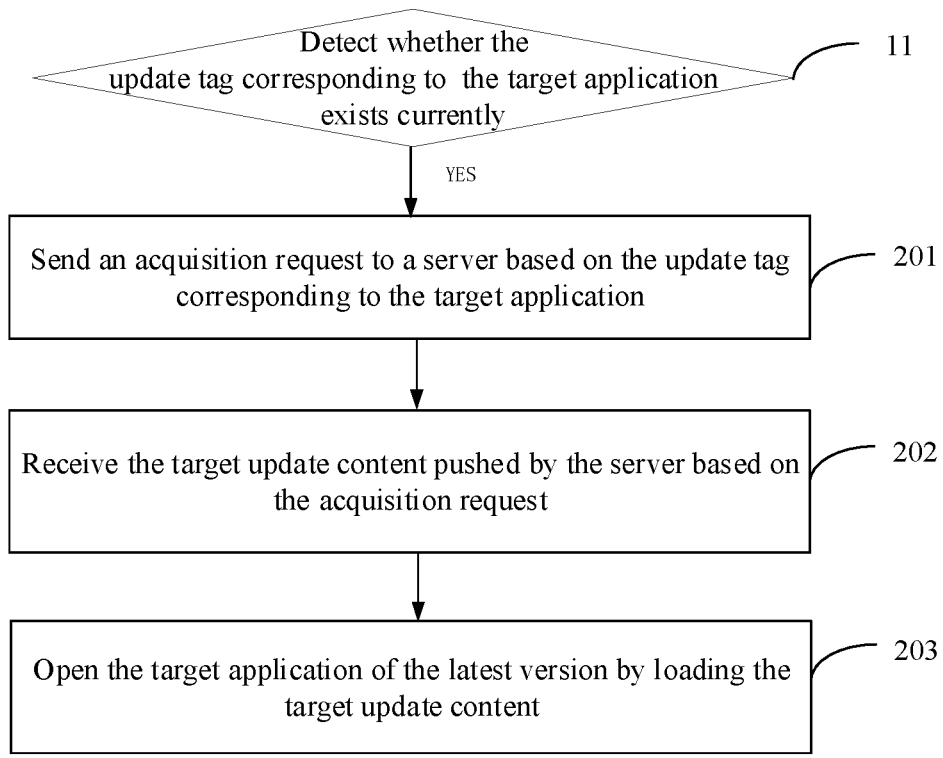
FIG. 10 is a flowchart of still another method of updating an application illustrated according to an example.

FIG. 10 is a flowchart illustrating another method of updating an application illustrated according to the example as shown in FIG. 7. This method of updating an application may further include following blocks.

At block 11, it may be determined whether the update tag corresponding to the target application exists currently.

In an example of the present disclosure, after determining that it is required to open the target application, the terminal may detect whether the update tag exists currently. When the update tag exists, the terminal may continue to perform the block 201, at which an acquisition request for requesting to acquire the target update content corresponding to the target application is sent to the server based on the update tag corresponding to the target application pushed by the server in advance.

When the update tag does not exist, this indicates that the target application has a latest version and thus it is not required to update the target application. Therefore, the terminal may search, from a local folder, for the target loading content required for opening the target application, and may open the target application after loading the target loading content.

Through the above procedures, after determining that it is required to open the target application, the terminal may first detect whether the update tag corresponding to the target application exists. When the update tag exists, the terminal may request to acquire the target update content based on the update tag. When the update tag does not exist, this indicates that the target application stored on the terminal has a latest version. Then, the terminal may load the target loading content required for opening the target application, such that the target application of the latest version can be opened.

Figure 11:
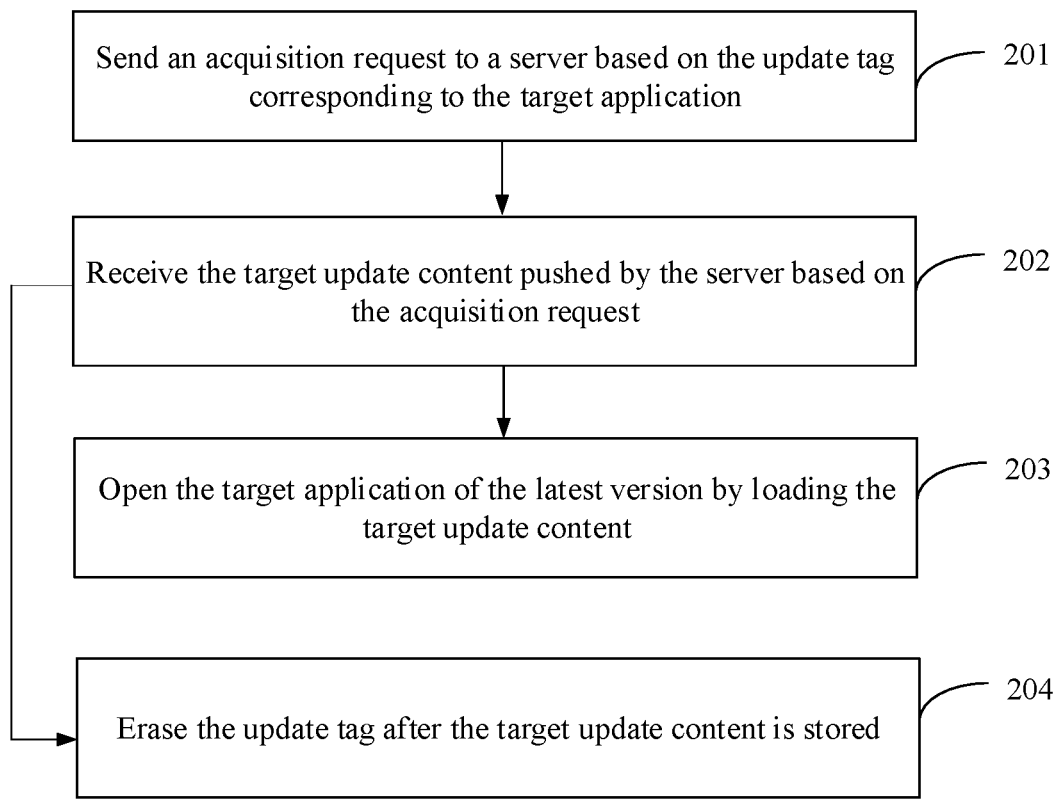
FIG. 11 is a flowchart of still another method of updating an application illustrated according to an example.

FIG. 11 is a flowchart illustrating another method of updating an application illustrated according to the example as shown in FIG. 7. This method of updating an application may further include following blocks.

At block 204, the update tag may be erased after the target update content is stored.

This block may be executed after block 202. That is, after receiving the target update content pushed by the server, the terminal may store the target update content at a designated file directory. Further, the terminal may erase the previously-stored update tag corresponding to the target application.

Through the above procedures, after acquiring the target update content pushed by the server, the terminal may store the target update content, and further may erase the update tag. Through the above procedures, when the server determines again that the target application needs to be updated, the update tag may be pushed to the terminal, thereby ensuring the accuracy of the update tag stored on the terminal.

Figure 12:
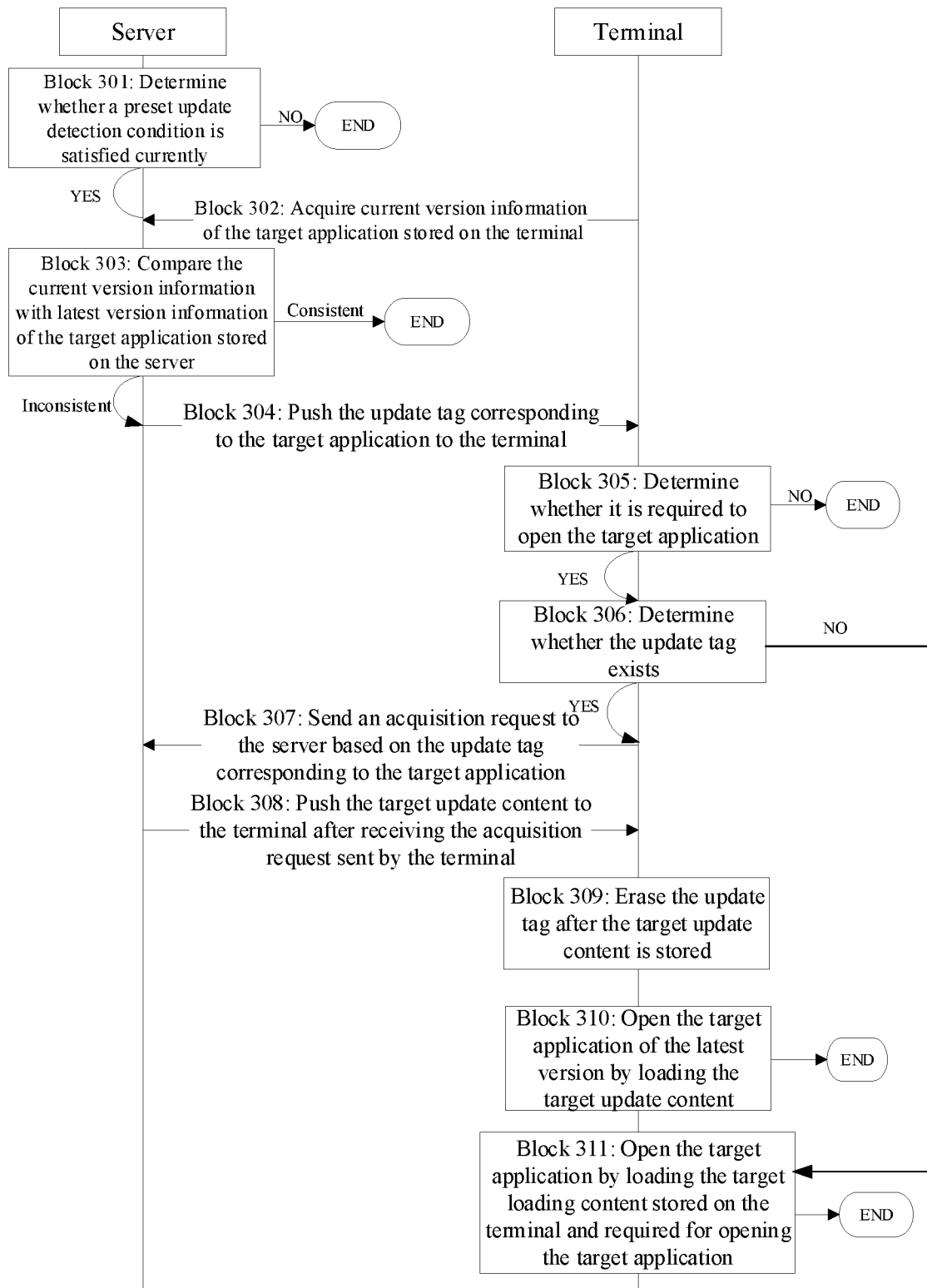
FIG. 12 is a flowchart of still another method of updating an application illustrated according to an example.

FIG. 12 is a flowchart illustrating another method of updating an application illustrated according to an aspect of the disclosure. This method of updating an application may include following blocks.

At block 301, the server may determine whether a preset update detection condition is satisfied currently.

Block 302 is proceeded when the update detection condition is satisfied. Otherwise the current flow is ended.

At block 302, the server may acquire current version information of the target application stored on the terminal.

At block 303, the server may compare the current version information with latest version information of the target application stored on the server. The current flow may be ended when the current version information is consistent with the latest version information. Block 304 is proceeded when the current version information is inconsistent with the latest version information.

At block 304, the server may push the update tag corresponding to the target application to the terminal.

At block 305, the terminal may determine whether it is required to open the target application. Block 306 is proceeded when it is required to open the target application. Otherwise the current flow is ended.

At block 306, the terminal may determine whether the update tag corresponding to the target application exists.

Block 307 is performed when the update tag exists. Otherwise Block 311 is performed.

At block 307, an acquisition request may be sent to the server based on the update tag. The acquisition request is used for requesting to acquire target update content corresponding to the target application.

At block 308, after receiving the acquisition request sent by the terminal, the server may push the target update content to the terminal.

At block 309, the terminal may erase the update tag after the target update content is stored.

At block 310, the terminal may open the target application of the latest version by loading the target update content.

After block 310 is finished, the above flow is ended.

At block 311, the terminal may open the target application after loading the target loading content stored on the terminal and required for opening the target application.

After block 311 is finished, the above flow is ended.

In the foregoing example, the target update content may be timely pushed to the target application of which installation is performed in background of the terminal, thereby ensuring that a target application opened by the terminal every time is the target application of the latest version.

It should be explained that, for a brief description, the foregoing method examples are described as a combination of a series of motions. However, those skilled in the art would know that the present disclosure is not limited by sequences of the motions described. This is because some blocks may be performed by using other sequences or be performed simultaneously in accordance with the present disclosure.

In addition, those skilled in the art would also learn that the examples described in the specification are for illustration only, and involved motions and modules are not necessary for the present disclosure.

Corresponding to the foregoing examples of an application function implementing method, the present disclosure also provides examples of an apparatus for implementing the above application function and a corresponding terminal.

Figure 13:
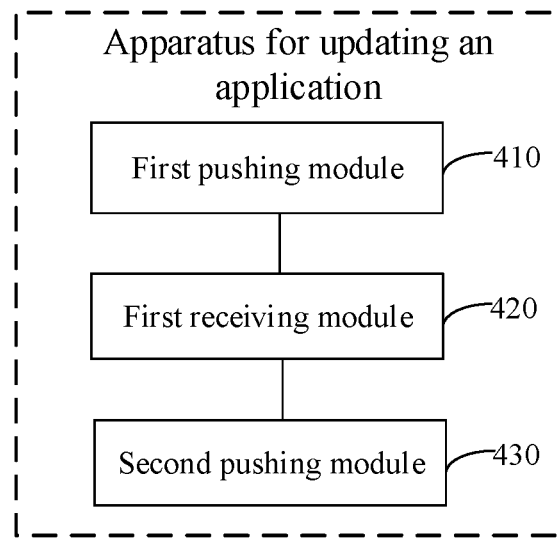
FIG. 13 is a block diagram of an apparatus for updating an application illustrated according to an example.

FIG. 13 is a block diagram of an apparatus for updating an application illustrated according to an example. The apparatus may be used in a server, including:

a first pushing module 410, configured to push an update tag corresponding to a target application to a terminal when determining that the target application is required to be updated;

a first receiving module 420, configured to receive an acquisition request sent by the terminal based on the update tag, the acquisition request being used for requesting to acquire a target update content corresponding to the target application; and a second pushing module 430, configured to push the target update content to the terminal based on the acquisition request, such that the terminal opens the target application of the latest version by loading the target update content.

Downloading and installation of the target application is performed in background of the terminal.

Figure 14:
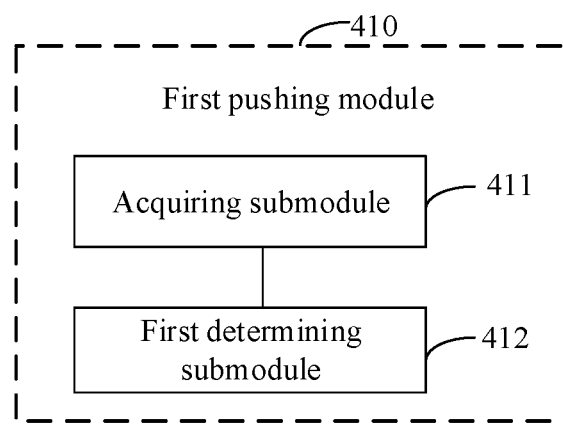
FIG. 14 is a block diagram of another apparatus for updating an application illustrated according to an example.

Reference may be made to FIG. 14, which is a flowchart of another apparatus for updating an application illustrated according to the example as shown in FIG. 13. The first pushing module 410 may include:

an acquiring submodule 411, configured to acquire current version information of the target application stored on the terminal;

a first determining submodule 412, configured to compare the current version information with latest version information of the target application stored on the server, and determine that the target application is required to be updated when the current version information is inconsistent with the latest version information.

Figure 15:
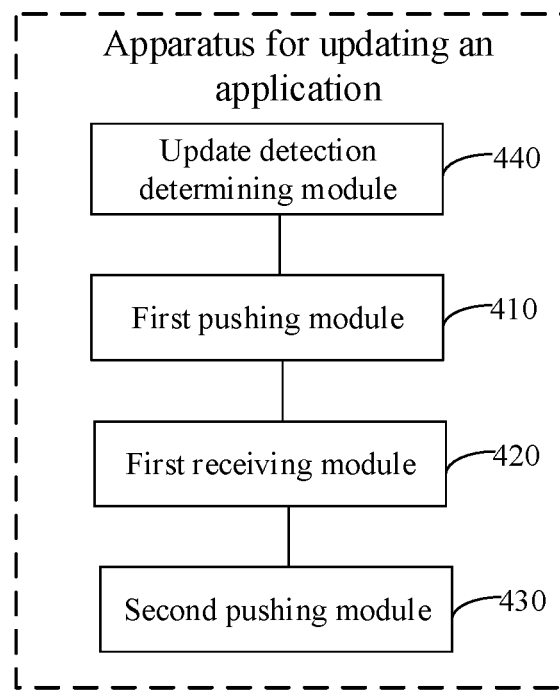
FIG. 15 is a block diagram of still another apparatus for updating an application illustrated according to an example.

Reference may be made to FIG. 15, which is a block diagram of another apparatus for updating an application illustrated according to the example as shown in FIG. 13. The apparatus may further include:

an update detection determining module 440, configured to determine whether a preset update detection condition is satisfied, and determine whether the target application is required to be updated when determining that the update detection condition is satisfied.

Alternatively, the update detection condition may include any one of the following conditions:

current time reaches a preset time point for an update detection;

the server receives an opening request sent by the terminal to request to open the target application;

the server receives a notification message sent by the terminal, the notification message being used for notifying an application platform configured to open the target application completes a start-up operation; or the server detects that the latest version information of the target application is changed.

Figure 16:
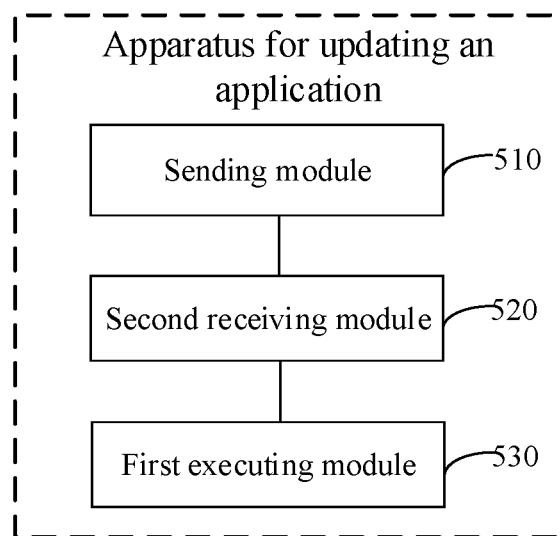
FIG. 16 is a block diagram of still another apparatus for updating an application illustrated according to an example.

FIG. 16 is a block diagram of an apparatus for updating an application illustrated according to an example, the apparatus may be used in a terminal, and the apparatus may include:

a sending module 510, configured to send an acquisition request to a server based on an update tag corresponding to a target application, the acquisition request being used for requesting to acquire a target update content corresponding to the target application;

a second receiving module 520, configured to receive the target update content pushed by the server based on the acquisition request; and a first executing module 530, configured to open the target application of the latest version by loading the target update content.

Downloading and installation of the target application may be performed in background of the terminal.

Figure 17:
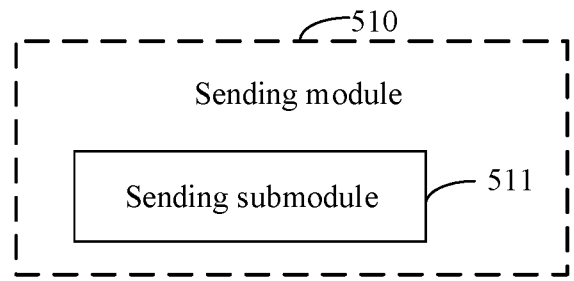
FIG. 17 is a block diagram of still another apparatus for updating an application illustrated according to an example.

Reference may be made to FIG. 17, which is a block diagram of another apparatus for updating an application illustrated according to the example as shown in FIG. 16. The sending module 510 may include:

a sending submodule 511, configured to send the acquisition request to the server based on the update tag corresponding to the target application when determining that the target application is required to be opened.

Figure 18:
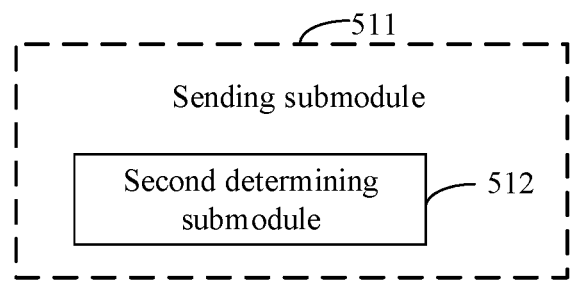
FIG. 18 is a block diagram of still another apparatus for updating an application illustrated according to an example.

Reference may be made to FIG. 18, which is a block diagram of another apparatus for updating an application illustrated according to the example as shown in FIG. 17. The sending submodule 511 may include:

a second determining submodule 512, configured to determine that the target application is required to be opened based on an operation of a user in an application store, a browser or an application platform configured to open the target application.

Figure 19:
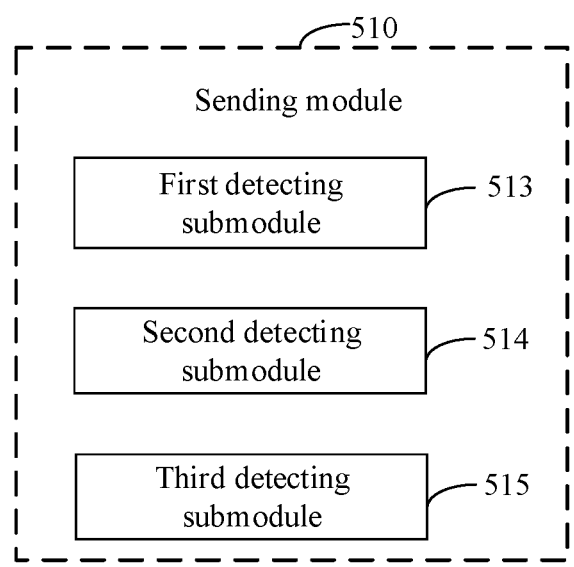
FIG. 19 is a block diagram of still another apparatus for updating an application illustrated according to an example.

Reference may be made to FIG. 19, which is a block diagram of another apparatus for updating an application illustrated according to the example as shown in FIG. 16. The sending module 510 may include any one of the following submodules:

a first detecting submodule 513, configured to detect contact information on a preset key used for opening the target application;

a second detecting submodule 514, configured to detect a trigger action for a preset icon corresponding to the target application; and a third detecting submodule 515, configured to detect a trigger action for a preset display element used for opening the target application.

Figure 20:
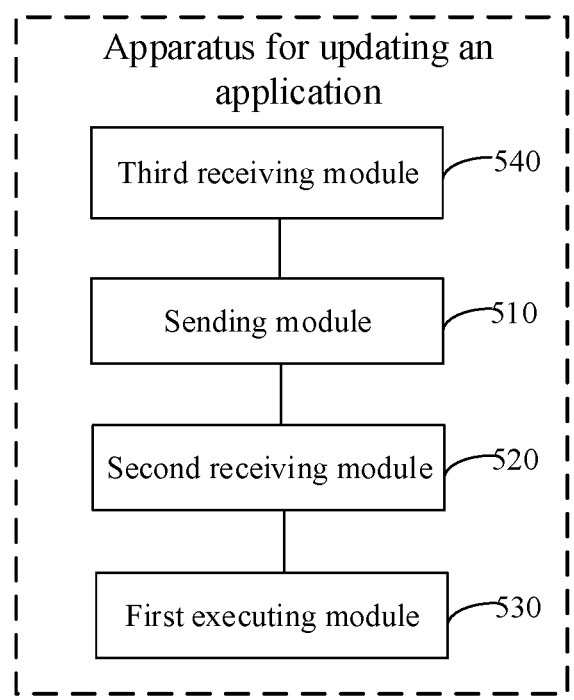
FIG. 20 is a block diagram of still another apparatus for updating an application illustrated according to an example.

Reference may be made to FIG. 20, which is a block diagram of another apparatus for updating an application illustrated according to the example as shown in FIG. 16. The apparatus may further include:

a third receiving module 540, configured to receive the update tag corresponding to the target application pushed by the server when determining that the target application is required to be updated.

Figure 21:
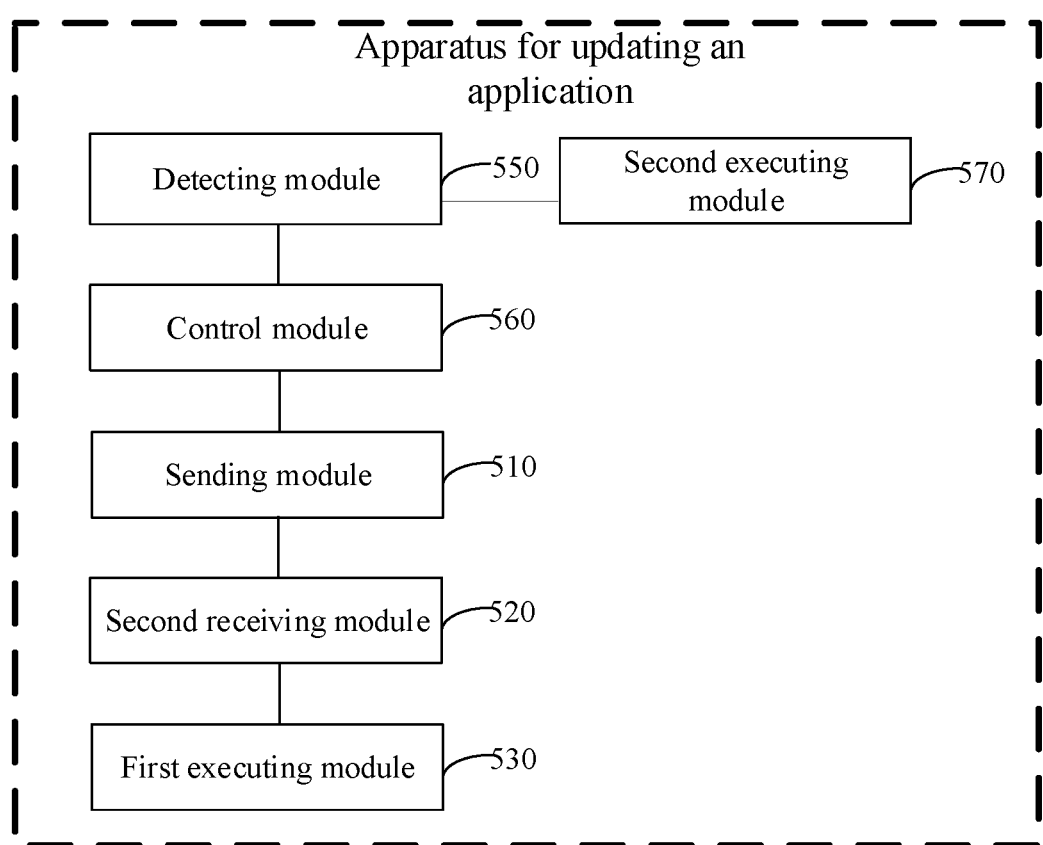
FIG. 21 is a block diagram of still another apparatus for updating an application illustrated according to an example.

Reference may be made to FIG. 21, which is a block diagram of another apparatus for updating an application illustrated according to the example as shown in FIG. 16. The apparatus may further include:

a detecting module 550, configured to detect whether the update tag corresponding to the target application is stored locally;

a control module 560, configured to control the sending module 510 to send the acquisition request to the server based on the update tag when detecting that the update tag is stored; or a second executing module 570, configured to open the target application by loading target loading content stored on the terminal and required for opening the target application when detecting that the update tag is not stored.

Figure 22:
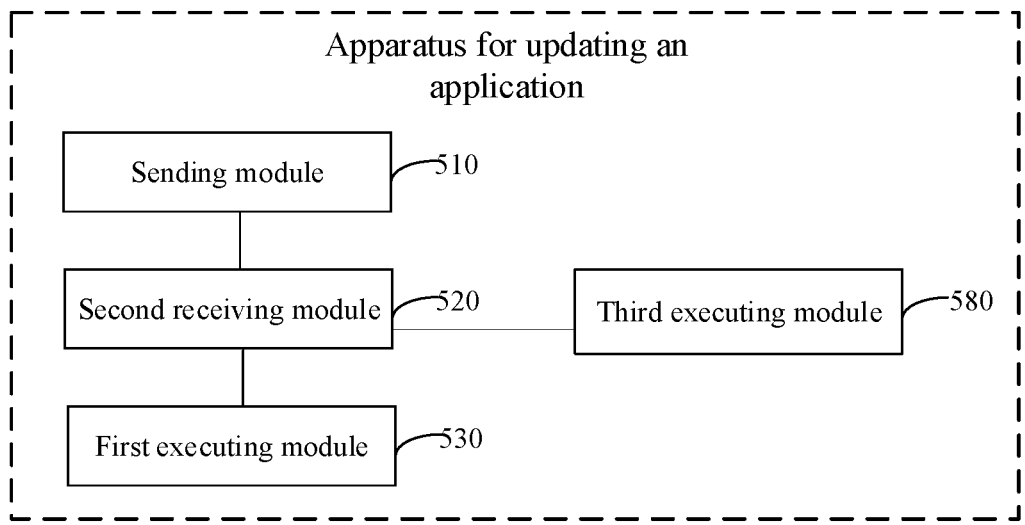
FIG. 22 is a block diagram of still another apparatus for updating an application illustrated according to an example.

Reference may be made to FIG. 22, which is a block diagram of another apparatus for updating an application illustrated according to the example as shown in FIG. 16. The apparatus may further include:

a third executing module 580, configured to erase the update tag after the target update content is stored.

Apparatus examples are basically corresponding to the method examples, and thus method examples can serve as reference. The apparatus examples set forth above are merely exemplary, wherein units described as detached parts can be or not be detachable physically; parts displayed as units can be or not be physical units, i.e., either located at the same place, or distributed on a plurality of network units. Modules can be selected in part or in whole according to the actual needs for realization of solutions of the present disclosure. It is conceivable and executable for those of ordinary skill in the art without creative labour.

Correspondingly, an example of the present disclosure further provides a machine-readable storage medium storing machine-executable instructions. The machine-executable instructions are used for executing any one of the application updating methods used in the server.

Correspondingly, an example of the present disclosure further provides a machine-readable storage medium storing machine-executable instructions. The machine-executable instructions are used for executing any one of the application updating methods used in the terminal.

Correspondingly, an example of the present disclosure further provides an application updating apparatus used in a server, including:

a processor, and a machine-readable storage medium, configured to store machine-executable instructions executable by the processor.

By executing the machine-executable instructions, the processor is caused to:

push an update tag corresponding to a target application to a terminal when determining that the target application is required to be updated;

receive an acquisition request sent by the terminal based on the update tag, the acquisition request being used for requesting to acquire a target update content corresponding to the target application; and push the target update content to the terminal based on the acquisition request, such that the terminal opens the target application of the latest version by loading the target update content.

Downloading and installation of the target application may be performed in background of the terminal.

Figure 23:
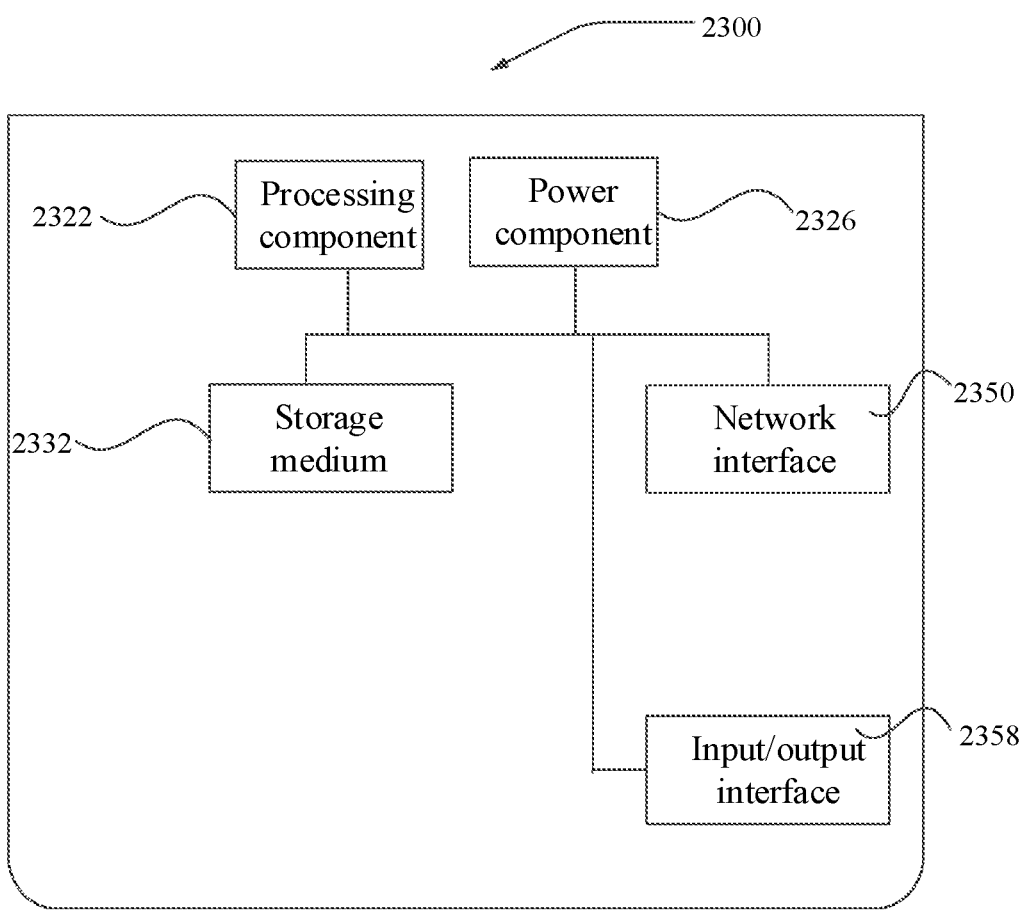
FIG. 23 is a schematic structural diagram of an apparatus for updating an application illustrated according to an example of the present disclosure.

FIG. 23 is a schematic structural diagram of an apparatus 2300 for updating an application illustrated according to an example of the present disclosure. For example, the apparatus 2300 may be provided with a server. Referring to FIG. 23, the apparatus 2300 may include a processing component 2322, which further includes one or more processors, and memory resource represented by a storage medium 2332 and configured to store instructions that can be executed by the processing component 2322, for example, an application program. The application program stored in the storage medium 2332 may include one or more modules each of which is corresponding to a set of instructions. In addition, the processing component 2322 is configured to execute instructions so as to execute the foregoing application updating method.

The apparatus 2300 may also include a power component 2326 configured to execute the power management of the apparatus 2300, a wired or wireless network interface 2350 configured to connect the apparatus 2300 to the network, and an input/output (I/O) interface 2358. The apparatus 2300 may operate based on an operating system stored in the storage medium 2332, for example, Android, IOS, Windows Server™, Mac OS X™, Unix™, Linux™, FreeBSD™ or other similar operating systems.

When the instructions in the storage medium 2332 are executed by the processing component 2322, the apparatus 2300 is caused to perform another method of updating an application, including:

pushing an update tag corresponding to a target application to a terminal when determining that the target application is required to be updated;

receiving an acquisition request sent by the terminal based on the update tag, the acquisition request being used for requesting to acquire target update content corresponding to the target application; and pushing the target update content to the terminal based on the acquisition request, such that the terminal opens the target application of the latest version by loading the target update content.

Downloading and installation of the target application may be performed in background of the terminal.

Correspondingly, an example of the present disclosure further provides an apparatus for updating an application used in a terminal, including:

a processor, and a machine-readable storage medium, configured to store machine-executable instructions executable by the processor.

By executing the machine-executable instructions, the processor is caused to:

send an acquisition request to a server based on an update tag corresponding to a target application, the acquisition request being used for requesting to acquire a target update content corresponding to the target application;

receive the target update content pushed by the server based on the acquisition request; and open the target application of the latest version by loading the target update content.

Downloading and installation of the target application may be performed in background of the terminal.

Figure 24:
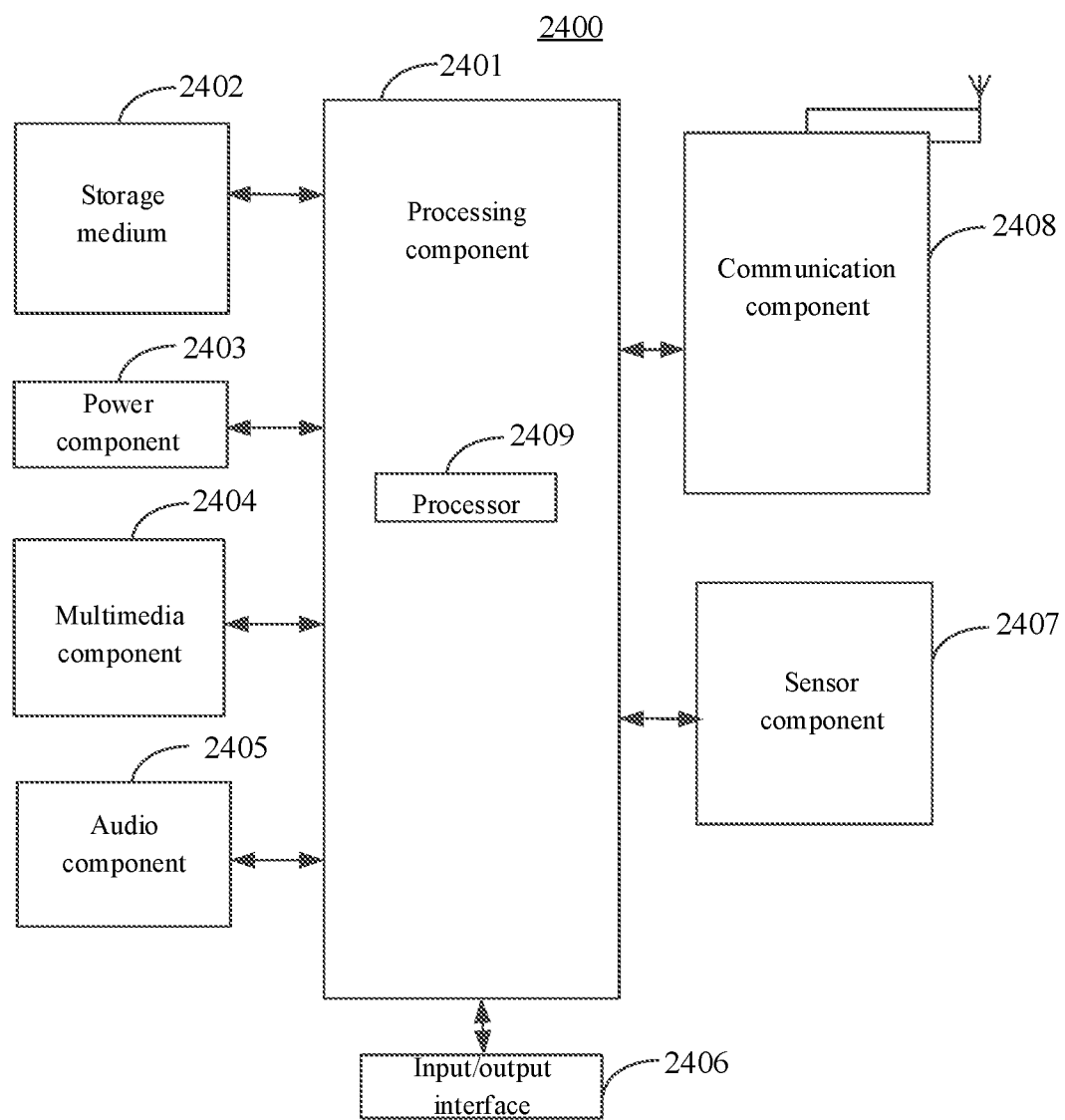
FIG. 24 is a schematic structural diagram of another apparatus for updating an application illustrated according to an example of the present disclosure.

FIG. 24 is a schematic structural diagram of an apparatus for updating an application illustrated according to an example. FIG. 24 shows an apparatus 2400 for updating an application according to an example. The apparatus 2400 may be a computer, a mobile phone, a digital broadcast terminal, a message transceiver device, a game console, a tablet device, a medical equipment, a fitness equipment, a personal digital assistant, and the like.

Referring to FIG. 24, the apparatus 2400 may include one or more of the following components: a processing component 2401, a storage medium 2402, a power component 2403, a multimedia component 2404, an audio component 2405, an input/output (I/O) interface 2406, a sensor component 2407, and a communication component 2408.

The processing component 2401 typically controls overall operations of the apparatus 2400, such as the operations associated with display, telephone calls, data communications, camera operations, and recording operations. The processing component 2401 may include one or more processors 2409 to execute instructions to perform all or part of the blocks in the above described methods. Moreover, the processing component 2401 may include one or more modules which facilitate the interaction between the processing component 2401 and other components For instance, the processing component 2401 may include a multimedia module to facilitate the interaction between the multimedia component 2404 and the processing component 2401.

The storage medium 2402 is configured to store various types of data to support the operation of the apparatus 2400.

Examples of such data include instructions for any applications or methods operated on the apparatus 2400, contact data, phonebook data, messages, pictures, video, etc. The storage medium 2402 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2403 provides power to various components of the apparatus 2400. The power component 2403 may include a power management system, one or more power sources, and any other components associated with the generation, management, and distribution of power in the apparatus 2400.

The multimedia component 2404 includes a screen providing an output interface between the apparatus 2400 and the user. In some examples, the screen may include a liquid crystal display (LCD) and a touch panel (TP). If the screen includes a touch panel, the screen may be implemented as a touch screen to receive input signals from the user. The touch panel may include one or more touch sensors to sense touches, slips, and gestures on the touch panel. The touch sensors may not only sense a boundary of a touch or slip action, but also sense a period of time and a pressure associated with the touch or slip action. In some examples, the multimedia component 2404 includes a front camera and/or a rear camera. The front camera and/or the rear camera may receive an external multimedia datum while the apparatus 2400 is in an operation mode, such as a photographing mode or a video mode. Each of the front camera and the rear camera may be a fixed optical lens system or have focus and optical zoom capability.

The audio component 2405 is configured to output and/or input audio signals. For example, the audio component 2405 includes a microphone ("MIC") configured to receive an external audio signal when the apparatus 2400 is in an operation mode, such as a call mode, a recording mode, and a voice recognition mode. The received audio signal may be further stored in the memory 2402 or transmitted via the communication component 2408. In some examples, the audio component 2405 further includes a speaker to output audio signals.

The I/O interface 2406 provides an interface between the processing component 2401 and peripheral interface modules, such as a keyboard, a click wheel, buttons, and the like. The buttons may include, but are not limited to, a home button, a volume button, a starting button, and a locking button.

The sensor component 2407 includes one or more sensors to provide status assessments of various aspects of the apparatus 2400. For instance, the sensor component 2407 may detect an open/closed status of the apparatus 2400, relative positioning of components, e.g., the display and the keypad, of the apparatus 2400, a change in position of the apparatus 2400 or a component of the apparatus 2400, a presence or absence of user contact with the apparatus 2400, an orientation or an acceleration/deceleration of the apparatus 2400, and a change in temperature of the apparatus 2400. The sensor component 2407 may include a proximity sensor configured to detect the presence of nearby objects without any physical contact. The sensor component 2407 may also include a light sensor, such as a CMOS or CCD image sensor, for use in imaging applications. In some examples, the sensor component 2407 may also include an accelerometer sensor, a gyroscope sensor, a magnetic sensor, a pressure sensor, or a temperature sensor.

The communication component 2408 is configured to facilitate communication, wired or wirelessly, between the apparatus 2400 and other devices. The apparatus 2400 can access a wireless network based on a communication standard, such as WiFi, 2G, or 3G, or a combination thereof. In an example, the communication component 2408 receives a broadcast signal or broadcast associated information from an external broadcast management system via a broadcast channel. In an example, the communication component 2408 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some examples, the apparatus 2400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some examples, there is also provided a non-transitory machine-readable storage medium including instructions, such as included in the storage medium 2402, executable by the processor 2409 in the apparatus 2400, for performing the above-described method. For example, the non-transitory machine-readable storage medium may be a ROM, a RAM, a CD-ROM, a magnetic tape, a floppy disc, an optical data storage device, and the like.

When the instructions in the storage medium are executed by the processor, the apparatus 2400 is caused to perform the method of updating an application.

In an example, a method of updating an application is provided, wherein, the method including:

sending, by a terminal, an acquisition request to a server based on an update tag corresponding to a target application, the acquisition request being used for requesting to acquire target update content corresponding to the target application;

receiving, by the terminal, the target update content pushed by the server based on the acquisition request; and opening, by the terminal, the target application of a latest version by loading the target update content;

wherein downloading and installation of the target application is performed in background of the terminal.

In an example, sending the acquisition request to the server based on the update tag corresponding to the target application includes:

when determining that the target application is required to be opened, sending, by the terminal, the acquisition request to the server based on the update tag corresponding to the target application.

In an example, determining that the target application is required to be opened includes:

determining, by the terminal, that the target application is required to be opened based on an operation of a user in an application store, a browser or an application platform configured to open the target application.

In an example, the terminal determines that the target application is required to be opened when detecting any one of:

contact information on a preset key used for opening the target application;

a trigger action for a preset icon corresponding to the target application; and a trigger action for a preset display element used for opening the target application.

In an example, the method further includes:

receiving, by the terminal, the update tag corresponding to the target application pushed by the server when determining that the target application is required to be updated.

In an example, the method further includes:

detecting, by the terminal, whether the update tag corresponding to the target application is stored locally;

when detecting that the update tag is stored, sending, by the terminal, the acquisition request to the server based on the update tag; and when detecting that the update tag is not stored, opening, by the terminal, the target application by loading target loading content stored on the terminal and required for opening the target application.

In an example, the method further includes:

erasing, by the terminal, the update tag after the target update content is stored.

In an example, a server is provided, wherein, the server including:

a processor, and a machine-readable storage medium storing machine-executable instructions executable by the processor, wherein by executing the machine-executable instructions, the processor is caused to:

push an update tag corresponding to a target application to a terminal when determining that the target application is required to be updated;

receive an acquisition request sent by the terminal based on the update tag, the acquisition request being used for requesting to acquire target update content corresponding to the target application; and push the target update content to the terminal based on the acquisition request, such that the terminal opens the target application of a latest version by loading the target update content;

wherein downloading and installation of the target application is performed in background of the terminal.

In an example, when determining that the target application is required to be updated, the processor is further caused by the machine-executable instructions to:

acquire current version information of the target application stored on the terminal;

compare the current version information with latest version information of the target application stored on the server; and determine that the target application is required to be updated when the current version information is inconsistent with the latest version information.

In an example, the processor is further caused by the machine-executable instructions to:

determine whether a preset update detection condition is satisfied; and determine whether the target application is required to be updated when determining that the update detection condition is satisfied.

In an example, the update detection condition comprises any one of following conditions:

current time reaches a preset time point for an update detection;

the server receives an opening request sent by the terminal to request to open the target application;

the server receives a notification message sent by the terminal, the notification message being used for notifying an application platform configured to open the target application completes a start-up operation; and the server detects that latest version information of the target application is changed.

In an example, a terminal is provided, wherein, the terminal including:

a processor, and a machine-readable storage medium, configured to store machine-executable instructions executable by the processor;

wherein by executing the machine-executable instructions, the processor is caused to:

send an acquisition request to a server based on an update tag corresponding to a target application, the acquisition request being used for requesting to acquire target update content corresponding to the target application;

receive the target update content pushed by the server based on the acquisition request; and open the target application of a latest version by loading the target update content;

wherein downloading and installation of the target application is performed in background of the terminal.

In an example, when sending the acquisition request to the server based on the update tag corresponding to the target application, the processor is further caused by the machine-executable instructions to:

send the acquisition request to the server based on the update tag corresponding to the target application when determining that the target application is required to be opened.

In an example, when determining that the target application is required to be opened, the processor is further caused by the machine-executable instructions to:

determine that the target application is required to be opened based on an operation of a user in an application store, a browser or an application platform configured to open the target application.

In an example, the terminal determines that the target application is required to be opened when detecting any one of:

contact information on a preset key used for opening the target application;

a trigger action for a preset icon corresponding to the target application; and a trigger action for a preset display element used for opening the target application.

In an example, the terminal is further caused by the machine-executable instructions to:

receive the update tag corresponding to the target application pushed by the server when determining that the target application is required to be updated.

In an example, the terminal is further caused by the machine-executable instructions to:

detect whether the update tag corresponding to the target application is stored locally;

send the acquisition request to the server based on the update tag when detecting that the update tag is stored; and open the target application by loading target loading content stored on the terminal and required for opening the target application when detecting that the update tag is not stored.

In an example, the processor is further caused by the machine-executable instructions to:

erase the update tag after the target update content is stored.

In an example, a machine-readable storage medium storing machine-executable instructions is provided, where the machine-executable instructions are used for executing any one of the above-described methods of updating an application.

Other examples of the present disclosure will be apparent to those skilled in the art from consideration of the specification and practice of the invention disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

The examples set forth above are only illustrated as examples of the present disclosure, and are not intended to limit the present disclosure. All modifications, equivalent substitutions and improvements made within the spirit and principles of the present disclosure shall fall within the protection scope of the present disclosure.

What is claimed is:

1. A method for updating an application, comprising:
   detecting, by a terminal, whether an update tag corresponding to a target application is stored locally;
   when detecting that the update tag is not stored, opening, by the terminal, the target application by loading target loading content stored on the terminal;
   when detecting that the update tag is stored, sending, by the terminal, an acquisition request to a server based on the update tag corresponding to the target application, the acquisition request requesting for target update content corresponding to the target application;
   receiving, by the terminal, the target update content pushed by the server based on the acquisition request; and
   opening, by the terminal, the target application of a latest version by loading the target update content;
   wherein the target application is an application downloaded and installed in background of the terminal.

2. The method according to claim 1, wherein sending the acquisition request to the server based on the update tag corresponding to the target application comprises:
   when determining that the target application is required to be opened, sending, by the terminal, the acquisition request to the server based on the update tag corresponding to the target application.

3. The method according to claim 2, wherein determining that the target application is required to be opened comprises:
   determining, by the terminal, that the target application is required to be opened based on an operation of a user in an application store, a browser or an application platform configured to open the target application.

4. The method according to claim 2, wherein the terminal determines that the target application is required to be opened when detecting at least one of following condition:
   contact information on a preset key used for opening the target application;
   a trigger action for a preset icon corresponding to the target application; and
   a trigger action for a preset display element used for opening the target application.

5. The method according to claim 1, further comprising:
   receiving, by the terminal, the update tag corresponding to the target application pushed by the server when determining that the target application is required to be updated.

6. The method according to claim 1, further comprising:
   erasing, by the terminal, the update tag after the target update content is stored.

7. A server, comprising:
   a processor, and
   a machine-readable storage medium storing machine-executable instructions executable by the processor, wherein by executing the machine-executable instructions, the processor is caused to:
   determine whether a preset update detection condition is satisfied;
   determine whether a target application is required to be updated when determining that the preset update detection condition is satisfied;
   push an update tag corresponding to the target application to a terminal when determining that the target application is required to be updated;
   receive an acquisition request sent by the terminal based on the update tag, the acquisition request requesting for target update content corresponding to the target application; and
   push the target update content to the terminal based on the acquisition request, such that the terminal opens the target application of a latest version by loading the target update content;
   wherein the target application is an application downloaded and installed in background of the terminal;
   wherein the preset update detection condition comprises at least one of following conditions:
   current time reaches a preset time point for an update detection;
   the server receives an opening request sent by the terminal to request to open the target application;
   the server receives a notification message sent by the terminal, the notification message being used for notifying an application platform configured to open the target application completes a start-up operation; and
   the server detects that latest version information of the target application is changed.

8. The server according to claim 7, wherein when determining that the target application is required to be updated, the processor is further caused by the machine-executable instructions to:
   acquire current version information of the target application stored on the terminal;
   compare the current version information with latest version information of the target application stored on the server; and
   determine that the target application is required to be updated when the current version information is inconsistent with the latest version information.

9. A terminal, comprising:
   a processor, and
   a machine-readable storage medium, configured to store machine-executable instructions executable by the processor;
   wherein by executing the machine-executable instructions, the processor is caused to:
   detect whether an update tag corresponding to a target application is stored locally;
   when detecting that the update tag is not stored, open the target application by loading target loading content stored on the terminal;
   when detecting that the update tag is stored, send an acquisition request to a server based on the update tag corresponding to the target application, the acquisition request requesting for target update content corresponding to the target application;

receive the target update content pushed by the server based on the acquisition request; and open the target application of a latest version by loading the target update content;

wherein the target application is an application downloaded and installed in background of the terminal.

10. The terminal according to claim 9, wherein when sending the acquisition request to the server based on the update tag corresponding to the target application, the processor is further caused by the machine-executable instructions to:

send the acquisition request to the server based on the update tag corresponding to the target application when determining that the target application is required to be opened.

11. The terminal according to claim 10, wherein when determining that the target application is required to be opened, the processor is further caused by the machine-executable instructions to:

determine that the target application is required to be opened based on an operation of a user in an application store, a browser or an application platform configured to open the target application.

12. The terminal according to claim 10, wherein the terminal determines that the target application is required to be opened when detecting any one of:

contact information on a preset key used for opening the target application;

a trigger action for a preset icon corresponding to the target application; and a trigger action for a preset display element used for opening the target application.

13. The terminal according to claim 9, wherein the terminal is further caused by the machine-executable instructions to:

receive the update tag corresponding to the target application pushed by the server when determining that the target application is required to be updated.

14. The terminal according to claim 9, wherein the processor is further caused by the machine-executable instructions to:

erase the update tag after the target update content is stored.

* * * * *